(12) United States Patent
Botura et al.

(10) Patent No.: US 9,849,991 B2
(45) Date of Patent: Dec. 26, 2017

(54) DEICER ZONES WITH SHEDDING-ENHANCED BORDERS

(71) Applicants: Galdemir Botura, San Diego, CA (US); Brian Burkett, Akron, OH (US); Milan Mitrovic, Del Mar, CA (US)

(72) Inventors: Galdemir Botura, San Diego, CA (US); Brian Burkett, Akron, OH (US); Milan Mitrovic, Del Mar, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 1077 days.

(21) Appl. No.: 13/860,868

(22) Filed: Apr. 11, 2013

(65) Prior Publication Data

US 2013/0270253 A1  Oct. 17, 2013

Related U.S. Application Data

(60) Provisional application No. 61/623,050, filed on Apr. 11, 2012, provisional application No. 61/623,047, filed on Apr. 11, 2012.

(51) Int. Cl.
| | |
|---|---|
| *B64D 15/02* | (2006.01) |
| *B64D 15/12* | (2006.01) |
| *H05B 1/02* | (2006.01) |
| *B64D 15/14* | (2006.01) |

(52) U.S. Cl.
CPC ............ *B64D 15/02* (2013.01); *B64D 15/12* (2013.01); *B64D 15/14* (2013.01); *H05B 1/0236* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,013,752 A | | 12/1961 | Rush | |
| 3,204,084 A | * | 8/1965 | Spencer, Jr. | B64D 15/12 219/202 |
| 3,397,302 A | * | 8/1968 | Hosford | B64D 15/12 219/202 |
| 3,463,418 A | * | 8/1969 | Miksch | B64C 23/06 244/134 R |
| 4,687,159 A | * | 8/1987 | Kageorge | B64D 15/166 244/134 A |

(Continued)

FOREIGN PATENT DOCUMENTS

| | | |
|---|---|---|
| CN | 1051537 A | 5/1991 |
| CN | 1116600 A | 2/1996 |

(Continued)

OTHER PUBLICATIONS

Chinese Office Action for CN Application No. 201310185754.4, dated Jan. 28, 2015, pp. 1-12.

(Continued)

*Primary Examiner* — Anne M Antonucci
*Assistant Examiner* — Renee M Larose
(74) *Attorney, Agent, or Firm* — Cantor Colburn LLP

(57) ABSTRACT

An ice protection system comprises deicing zones each including an envelope defining an ice-protection area. Adjacent envelopes have spanwise edge regions flanking shared interzone borders. The edge regions are provided with nonlinear contours having features which project-and-recess in a direction generally parallel to the airstream direction.

19 Claims, 30 Drawing Sheets

(56) References Cited

U.S. PATENT DOCUMENTS

| | | | | |
|---|---|---|---|---|
| 5,351,918 | A | * | 10/1994 | Giamati ............ B64D 15/14 244/134 D |
| 5,412,181 | A | * | 5/1995 | Giamati ............ H05B 3/342 219/212 |
| 5,657,951 | A | | 8/1997 | Giamati |
| 5,765,779 | A | | 6/1998 | Hancock et al. |
| 6,237,874 | B1 | | 5/2001 | Rutherford et al. |
| 6,338,455 | B1 | | 1/2002 | Rauch et al. |
| 7,246,773 | B2 | | 7/2007 | Stoner et al. |
| 7,278,610 | B2 | | 10/2007 | Giamati |
| 7,922,120 | B2 | | 4/2011 | Kumar et al. |
| 8,630,534 | B2 | | 1/2014 | Busch et al. |
| 8,857,767 | B2 | | 10/2014 | Stolte et al. |
| 2004/0094529 | A1 | | 5/2004 | Richter |
| 2005/0199610 | A1 | | 9/2005 | Ptasienski et al. |
| 2006/0043240 | A1 | | 3/2006 | Hindel et al. |
| 2006/0201933 | A1 | | 9/2006 | Carpino, II et al. |
| 2010/0123044 | A1 | | 5/2010 | Botura |
| 2010/0243811 | A1 | | 9/2010 | Stothers |
| 2012/0001026 | A1 | | 1/2012 | Caruel |
| 2014/0138490 | A1 | | 5/2014 | Botura et al. |
| 2014/0367522 | A1 | | 12/2014 | Stonestreetm, II et al. |

FOREIGN PATENT DOCUMENTS

| | | | |
|---|---|---|---|
| CN | 102007037 | A | 4/2011 |
| CN | 102007038 | A | 4/2011 |
| EP | 0680878 | A1 | 8/1995 |
| EP | 1593595 | A2 | 9/2005 |

OTHER PUBLICATIONS

Chinese Office Action for CN Application No. 201310187874.8, dated Feb. 3, 2015, pp. 1-16.
DIY Audio Projects, "Ohm's Law and Ohms Law Calculator", webpage, created Sep. 4, 2007, last updated Feb. 24, 2013, accessed Aug. 12, 2015; retrieved from: http://diyaudioprojects.com/Technical/Ohms-Law/, accessed Aug. 12, 2015, 2 pages.
Christopher Baird, response to "Why do thick wires dissipate less energy than thin wires?" in Yahoo answers, circa 2012, https://answers.yahoo.com/question/index?qid=20130603104357AAR74vc, accessed Dec. 2, 2015.
Gayathry v s, response to "Resistance of thin wire or thick wire of same lenght is greater?" in Yahoo Answers, circa 2007, https://answer.yahoo.com/question/index?qid=2008201200116AAplxdQ, accessed Dec. 2, 2015.
Wikipedia, "Electrical resistivity and conductivity" webpage, last modified on Nov. 23, 2015, https://en.wikipedia.org/wiki/electrical_resistivity_and_conductivity, accessed Dec. 2, 2015.
Extended European Search Report for EP Application No. 13163230.9-1754, dated Sep. 26, 2013, pp. 1-6.
Extended European Search Report for EP Application No. 13163231.7-1754, dated Sep. 26, 2013, pp. 1-4.
European Serach Report for application 13163231.7-1754/2650220 dated Sep. 26, 2013.
Merriam-Webster dictionary, "Density" (p. 1), http://www.merriam-webster.com/dictionary/density—accessed May 2, 2015.
EP Office Action, dated Apr. 12, 2016, for Application No. 13163230.9, 6 pages.
Wikipedia, Series and Parallel Circuits page, https://en.wikipedia.org/wiki/Series_and_parallel_circuits, accessed Mar. 26, 2016, 10 pages.

* cited by examiner

|     | 103 | 102 | 101 | 301 | 201 | 202 | 203 |
|-----|-----|-----|-----|-----|-----|-----|-----|
| $t_1$ | off | off | ON  | ON  | off | off | off |
| $t_2$ | off | ON  | off | ON  | off | off | off |
| $t_3$ | ON  | off | off | ON  | off | off | off |
| $t_4$ | off | off | off | ON  | ON  | off | off |
| $t_5$ | off | off | off | ON  | off | ON  | off |
| $t_6$ | off | off | off | ON  | off | off | ON  |
| $t_1$ | off | off | ON  | ON  | off | off | off |
| $t_2$ | off | ON  | off | ON  | off | off | off |
| $t_3$ | ON  | off | off | ON  | off | off | off |
| $t_4$ | off | off | off | ON  | ON  | off | off |
| $t_5$ | off | off | off | ON  | off | ON  | off |
| $t_6$ | off | off | off | ON  | off | off | ON  |
| $t_1$ | off | off | ON  | ON  | off | off | off |
| $t_2$ | off | ON  | off | ON  | off | off | off |
| $t_3$ | ON  | off | off | ON  | off | off | off |
| $t_4$ | off | off | off | ON  | ON  | off | off |
| $t_5$ | off | off | off | ON  | off | ON  | off |
| $t_6$ | off | off | off | ON  | off | off | ON  |
| $t_1$ | off | off | ON  | ON  | off | off | off |
| $t_2$ | off | ON  | off | ON  | off | off | off |
| $t_3$ | ON  | off | off | ON  | off | off | off |
| $t_4$ | off | off | off | ON  | ON  | off | off |
| $t_5$ | off | off | off | ON  | off | ON  | off |
| $t_6$ | off | off | off | ON  | off | off | ON  |

FIGURE 4

| | 103 | 102 | 101 | 301 | 201 | 202 | 203 |
|---|---|---|---|---|---|---|---|
| $t_1$ | off | off | ON | ON | ON | off | off |
| $t_2$ | off | ON | off | ON | off | ON | off |
| $t_3$ | ON | off | off | ON | off | off | ON |
| $t_1$ | off | off | ON | ON | ON | off | off |
| $t_2$ | off | ON | off | ON | off | ON | off |
| $t_3$ | ON | off | off | ON | off | off | ON |
| $t_1$ | off | off | ON | ON | ON | off | off |
| $t_2$ | off | ON | off | ON | off | ON | off |
| $t_3$ | ON | off | off | ON | off | off | ON |
| $t_1$ | off | off | ON | ON | ON | off | off |
| $t_2$ | off | ON | off | ON | off | ON | off |
| $t_3$ | ON | off | off | ON | off | off | ON |
| $t_1$ | off | off | ON | ON | ON | off | off |
| $t_2$ | off | ON | off | ON | off | ON | off |
| $t_3$ | ON | off | off | ON | off | off | ON |
| $t_1$ | off | off | ON | ON | ON | off | off |
| $t_2$ | off | ON | off | ON | off | ON | off |
| $t_3$ | ON | off | off | ON | off | off | ON |
| $t_1$ | off | off | ON | ON | ON | off | off |
| $t_2$ | off | ON | off | ON | off | ON | off |
| $t_3$ | ON | off | off | ON | off | off | ON |
| $t_1$ | off | off | ON | ON | ON | off | off |
| $t_2$ | off | ON | off | ON | off | ON | off |
| $t_3$ | ON | off | off | ON | off | off | ON |

FIGURE 5

| | 103 | 102 | 101 | 301 | 201 | 202 | 203 |
|---|---|---|---|---|---|---|---|
| $t_1$ | off | off | ON | ON | off | off | off |
| $t_2$ | off | ON | ON | ON | off | off | off |
| $t_3$ | off | ON | off | ON | off | off | off |
| $t_4$ | ON | off | off | ON | off | off | off |
| $t_5$ | off | off | off | ON | ON | off | off |
| $t_6$ | off | off | off | ON | ON | ON | off |
| $t_7$ | off | off | off | ON | off | ON | off |
| $t_8$ | off | off | off | ON | off | off | ON |
| $t_1$ | off | off | ON | ON | off | off | off |
| $t_2$ | off | ON | ON | ON | off | off | off |
| $t_3$ | off | ON | off | ON | off | off | off |
| $t_4$ | ON | off | off | ON | off | off | off |
| $t_5$ | off | off | off | ON | ON | off | off |
| $t_6$ | off | off | off | ON | ON | ON | off |
| $t_7$ | off | off | off | ON | off | ON | off |
| $t_8$ | off | off | off | ON | off | off | ON |
| $t_1$ | off | off | ON | ON | off | off | off |
| $t_2$ | off | ON | ON | ON | off | off | off |
| $t_3$ | off | ON | off | ON | off | off | off |
| $t_4$ | ON | off | off | ON | off | off | off |
| $t_5$ | off | off | off | ON | ON | off | off |
| $t_6$ | off | off | off | ON | ON | ON | off |
| $t_7$ | off | off | off | ON | off | ON | off |
| $t_8$ | off | off | off | ON | off | off | ON |

FIGURE 6

DEICER ZONES WITH SHEDDING-ENHANCED BORDERS

CROSS-REFERENCE TO RELATED APPLICATIONS AND PRIORITY CLAIM

This application claims priority under 35 U.S.C. 119(e) to U.S. Provisional Patent Application No. 61/623,050, filed Apr. 11, 2012, entitled "DEICER ZONES WITH SHEDDING-ENHANCED BORDERS", and to Application No. 61/623,047, filed Apr. 11, 2012, entitled "DEICER ZONES WITH HEATING-ENHANCED BORDERS", both of which are incorporated herein by reference in their entirety.

BACKGROUND

An aircraft will typically include an ice protection system to prevent excessive ice accumulation on its wings, stabilizers, engine inlet lips, and/or pylons. The ice protection system can incorporate an array of contiguous deicing zones associated with areas fore and/or aft of the leading edge. Each deicing zone can comprise an envelope corresponding to an ice-protection area on the aircraft.

SUMMARY

An ice protection system is provided wherein edge regions of adjacent deicing envelopes are configured to allow the ensuing airstream to enhance ice removal along spanwise interzone borders. Specifically, the relevant edge regions are provided with features which project and recess in a direction substantially parallel to the airstream direction. In this manner, ice accumulating along an interzone border is presented in vacillating pockets which can be easily broken by the airstream and swept away.

DRAWINGS

FIGS. 4-6 show standard power-supply procedures for the deicing zones of the ice protection system.

FIGS. 7A-7F, 8A-8F, 9A-9F, and 10A-10F show some possible nonlinear profiles for edge regions of deicing envelopes.

DESCRIPTION

Figure 1:
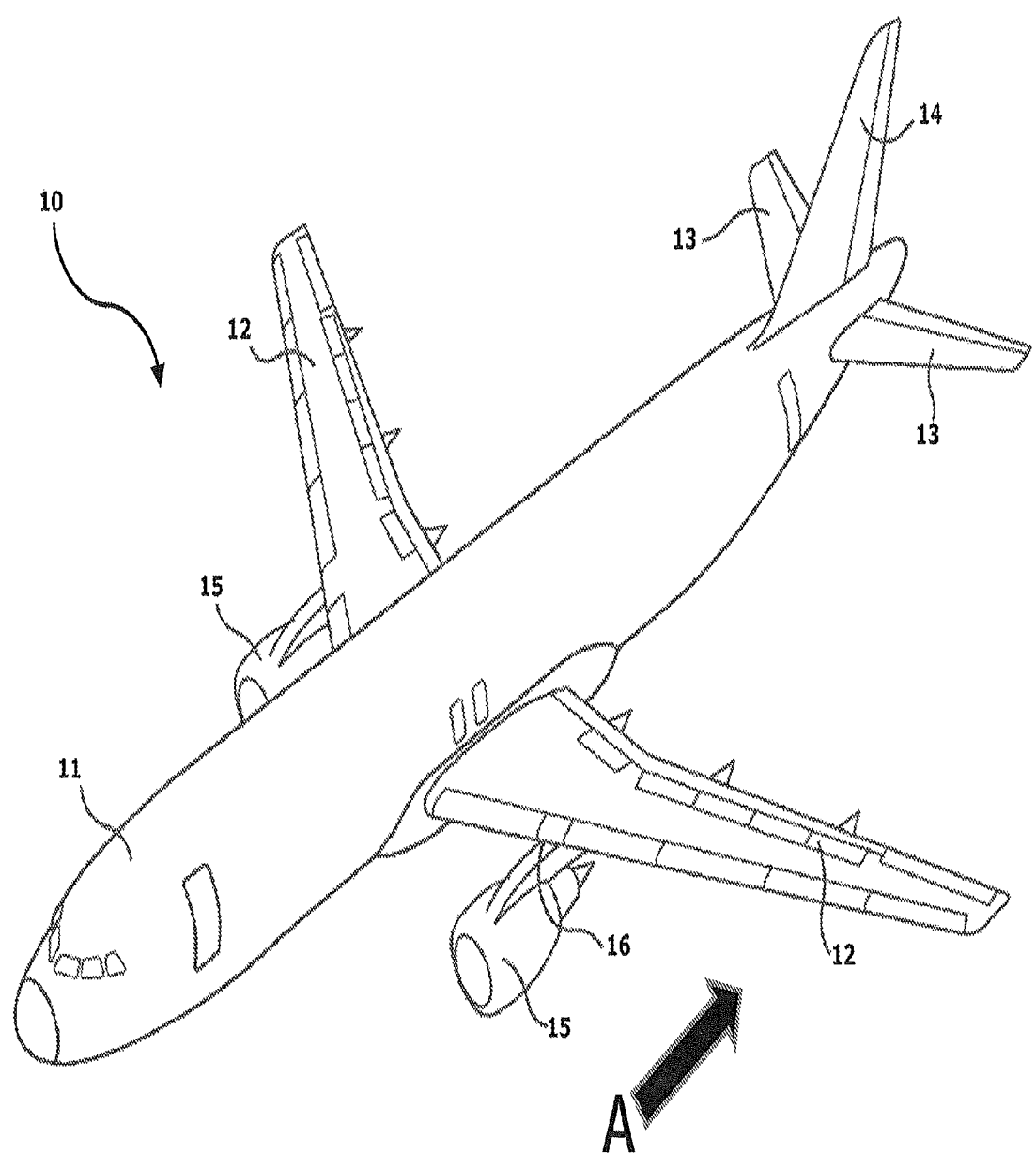
FIG. 1 shows an aircraft having several surfaces protectable by the ice protection system.

Referring to FIG. 1, an aircraft 10 can comprise fuselage 11, wings 12, horizontal stabilizers 13, a vertical stabilizer 14, engines 15, and pylons 16. The wings 12 are the aircraft's primary lift providers. The horizontal stabilizers 13 prevent up-down motion of the aircraft nose, and the vertical stabilizer 14 discourages side to side swinging. The engines 15 are the aircraft's thrust-providing means and the pylons 16 serve as underwing mounting means for the engines.

Figure 2:
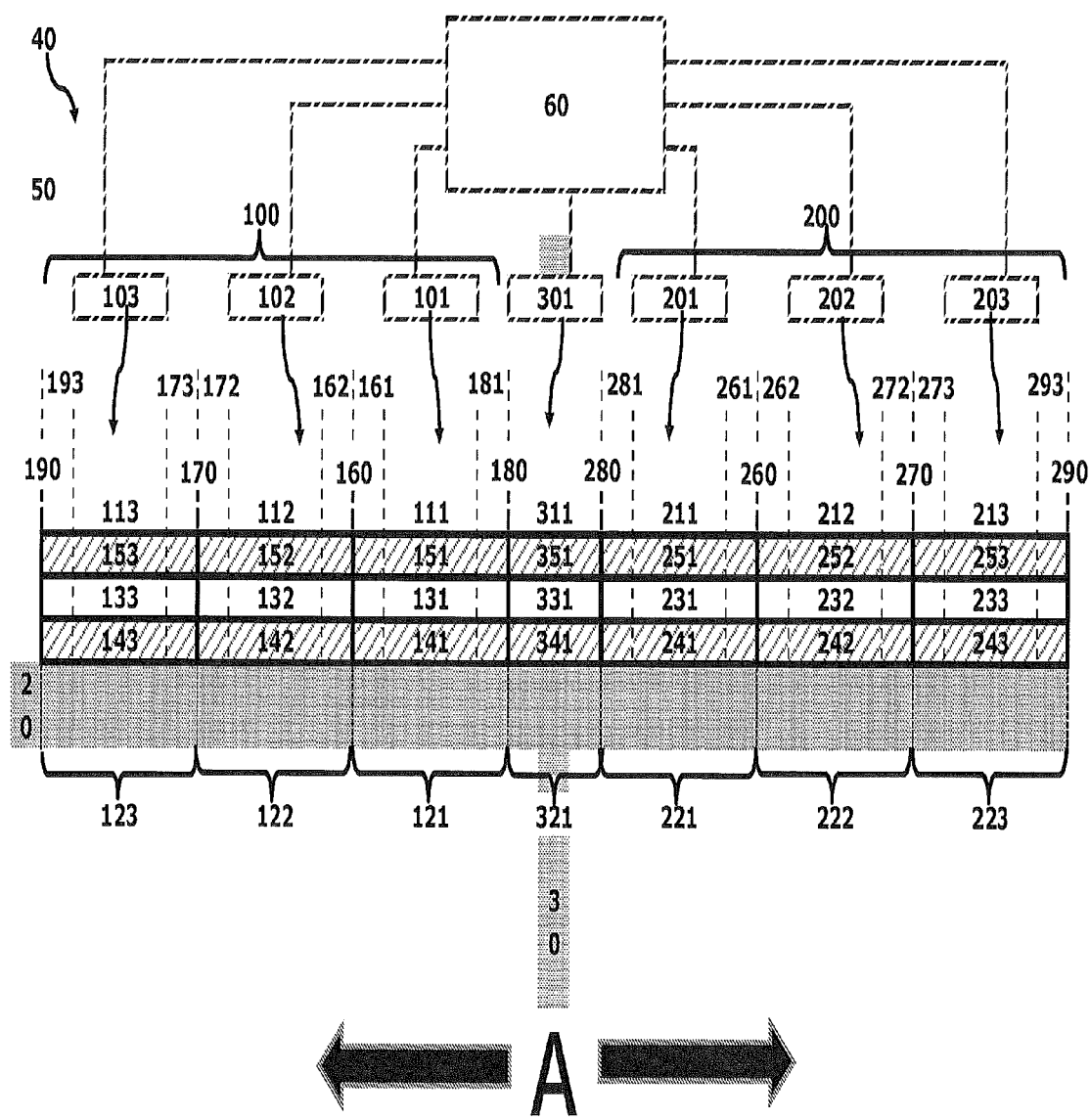
FIGS. 2-3 shows flattened views of the ice protection system
Figure 3:
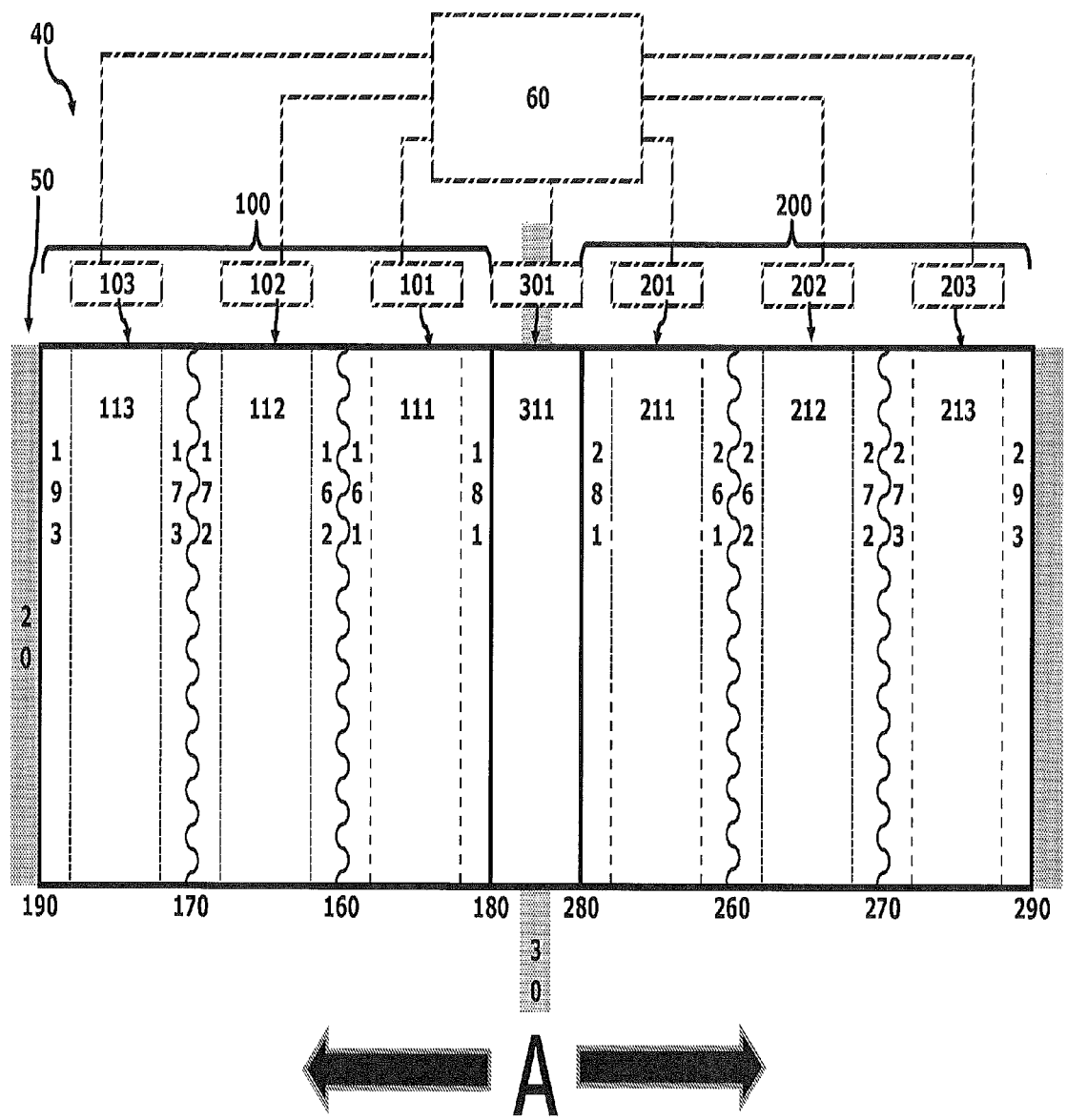
Figure 7A:
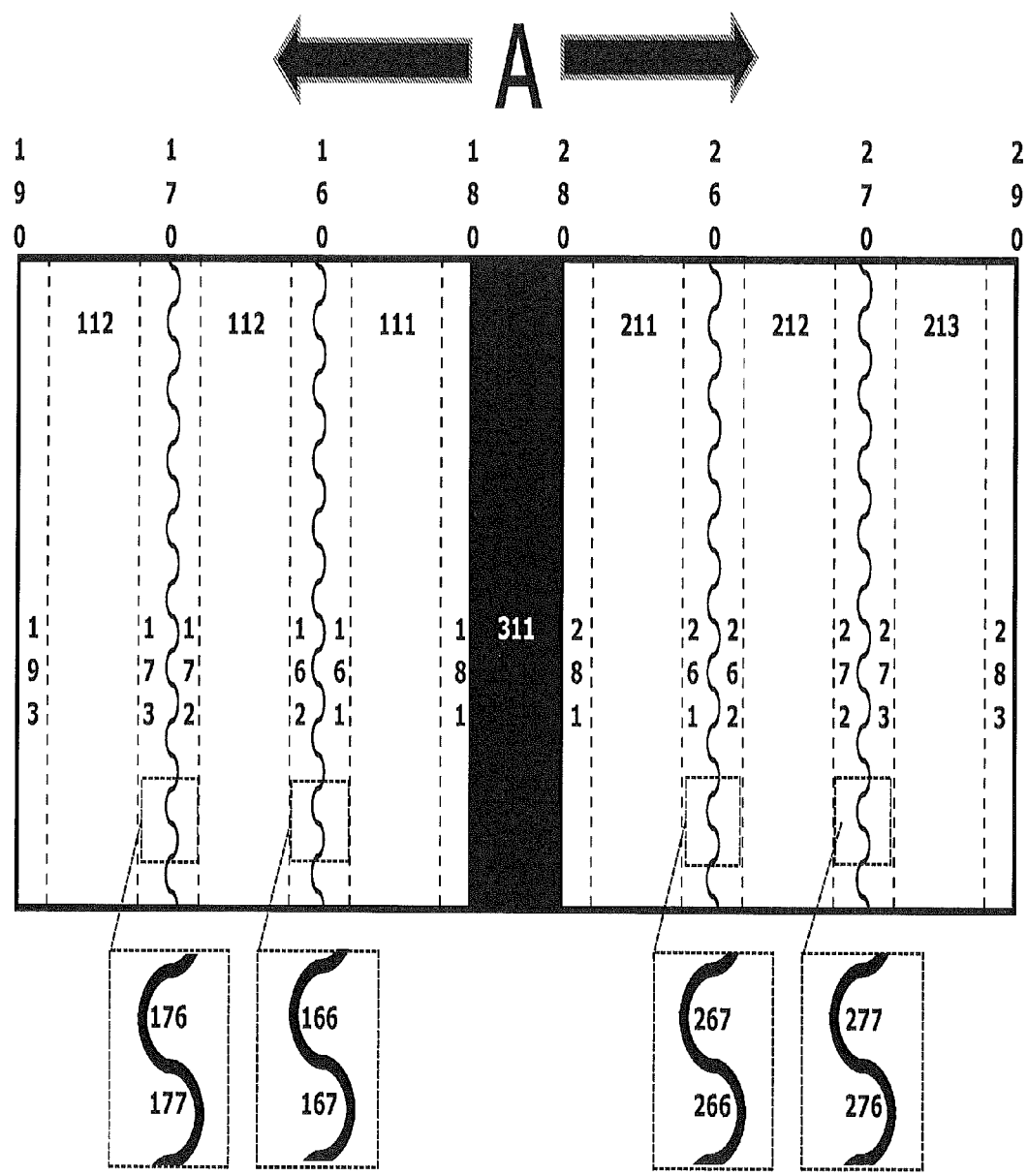
Figure 7B:
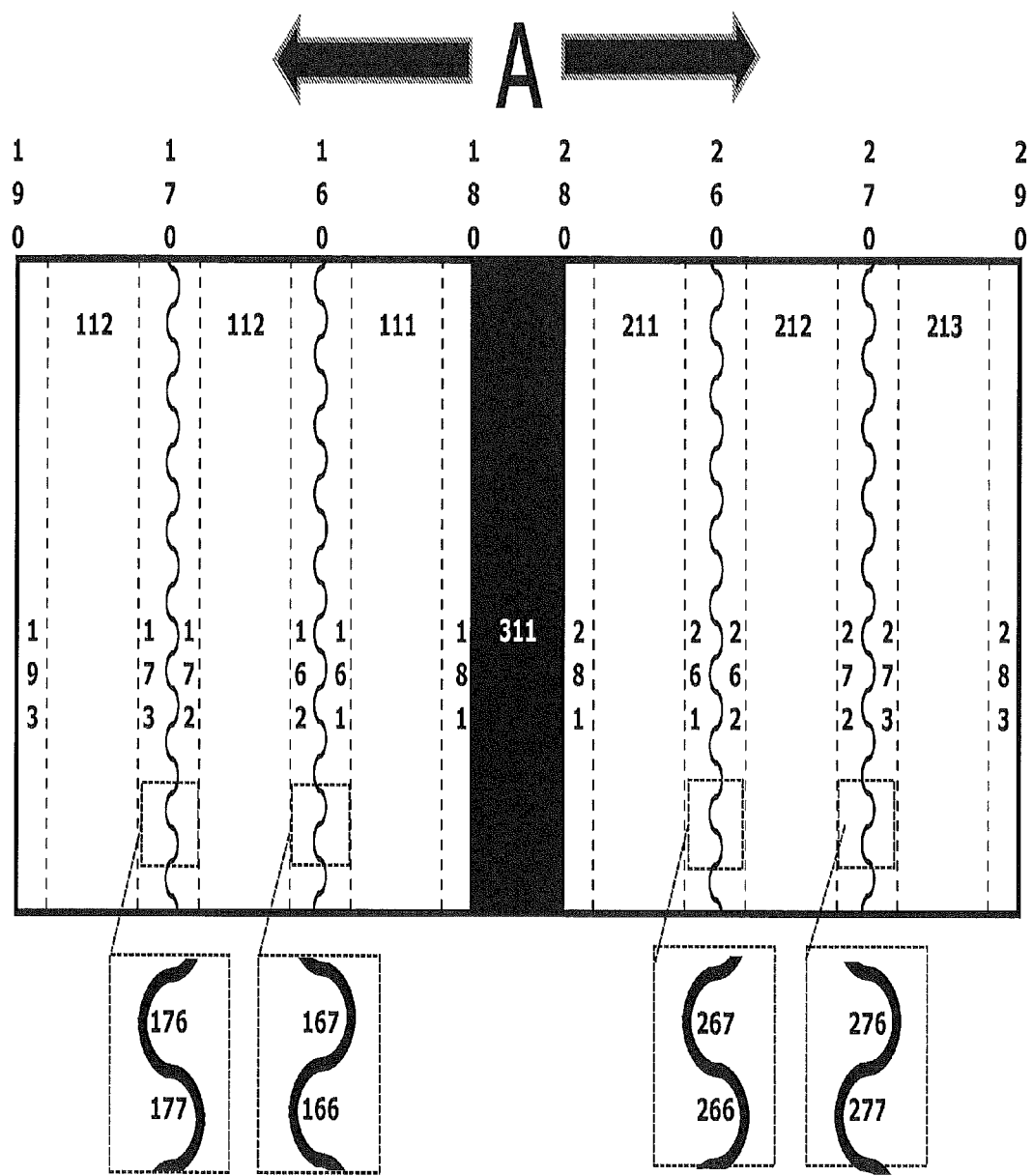
Figure 7C:
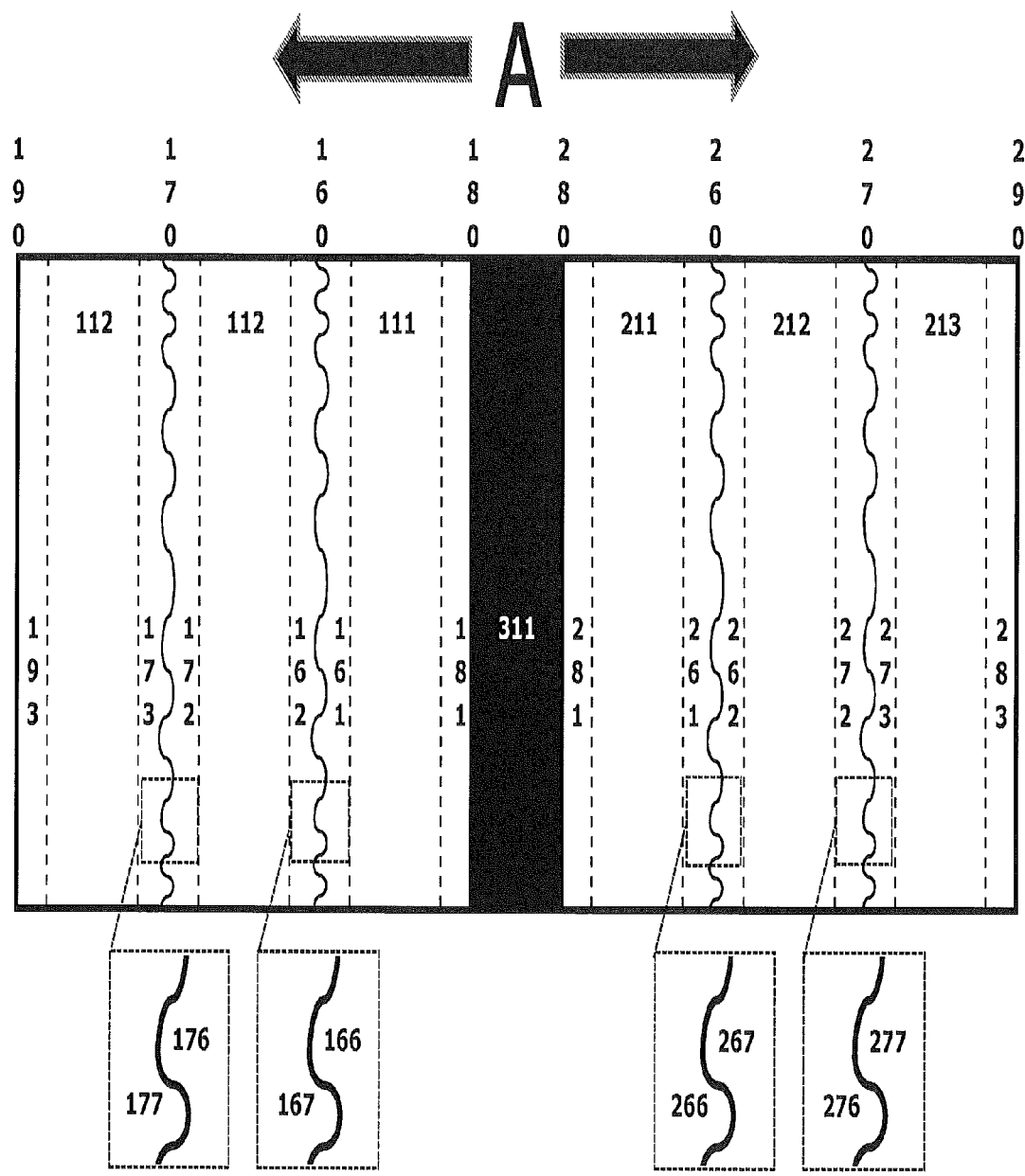
Figure 7D:
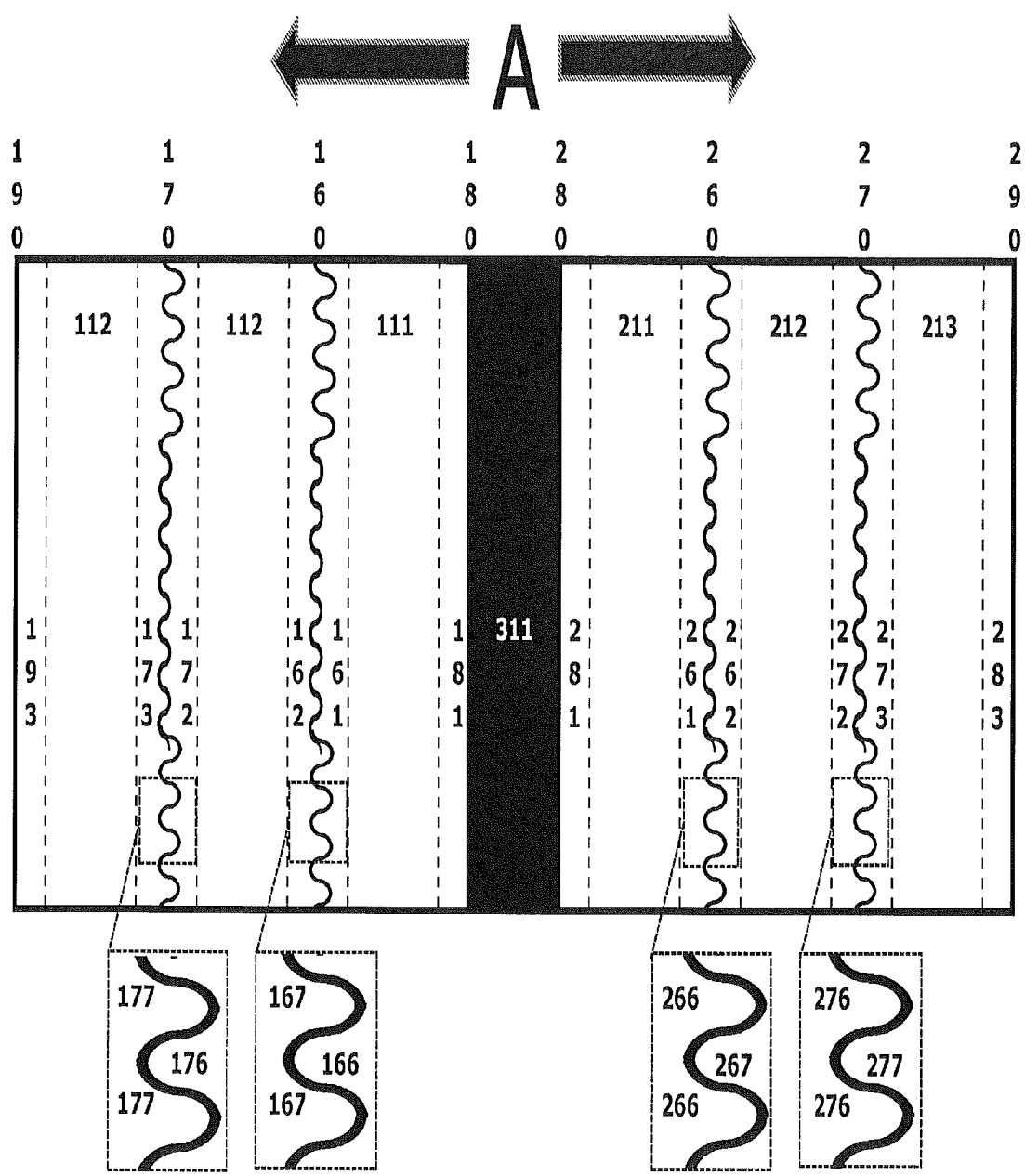
Figure 7E:
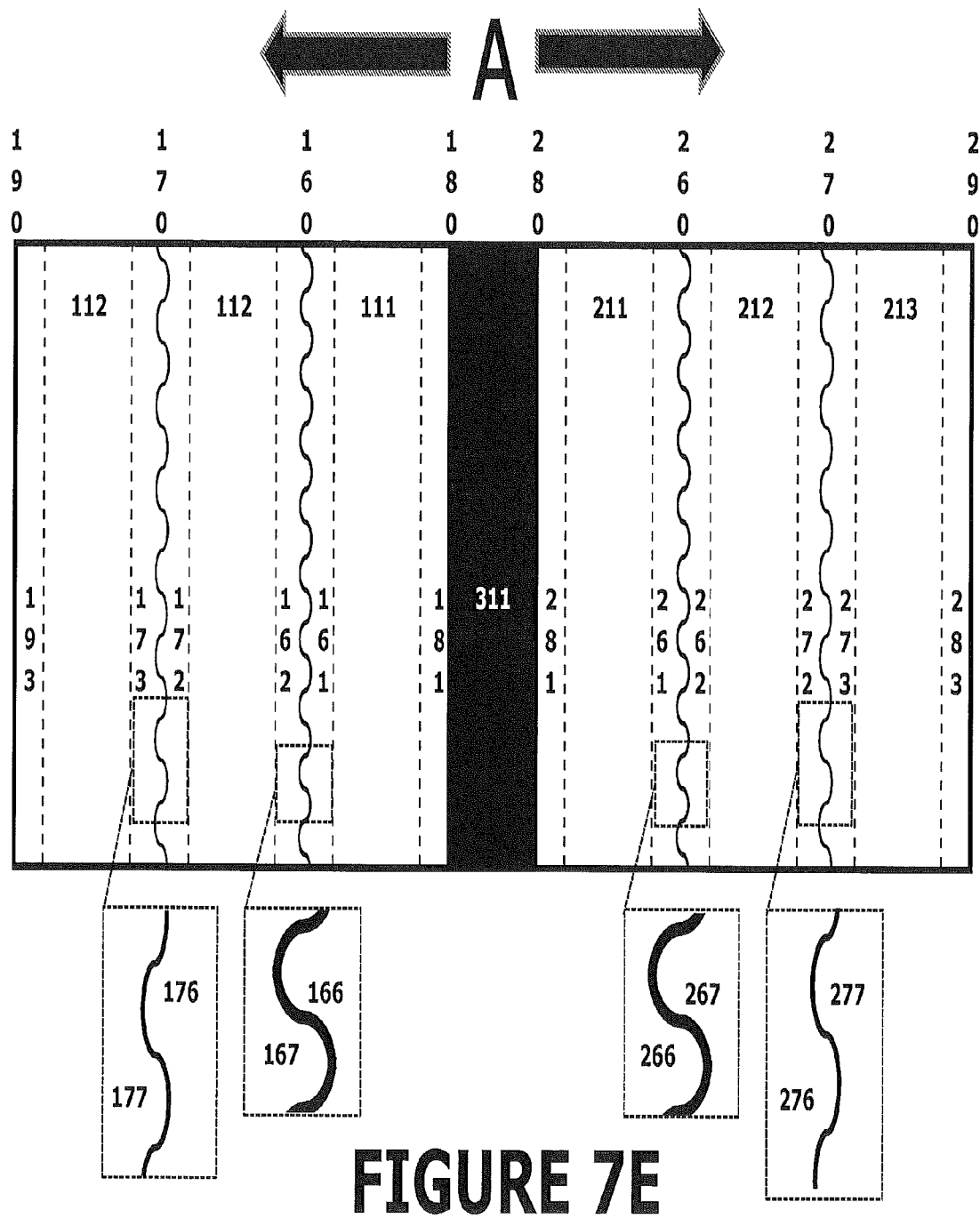
Figure 7F:
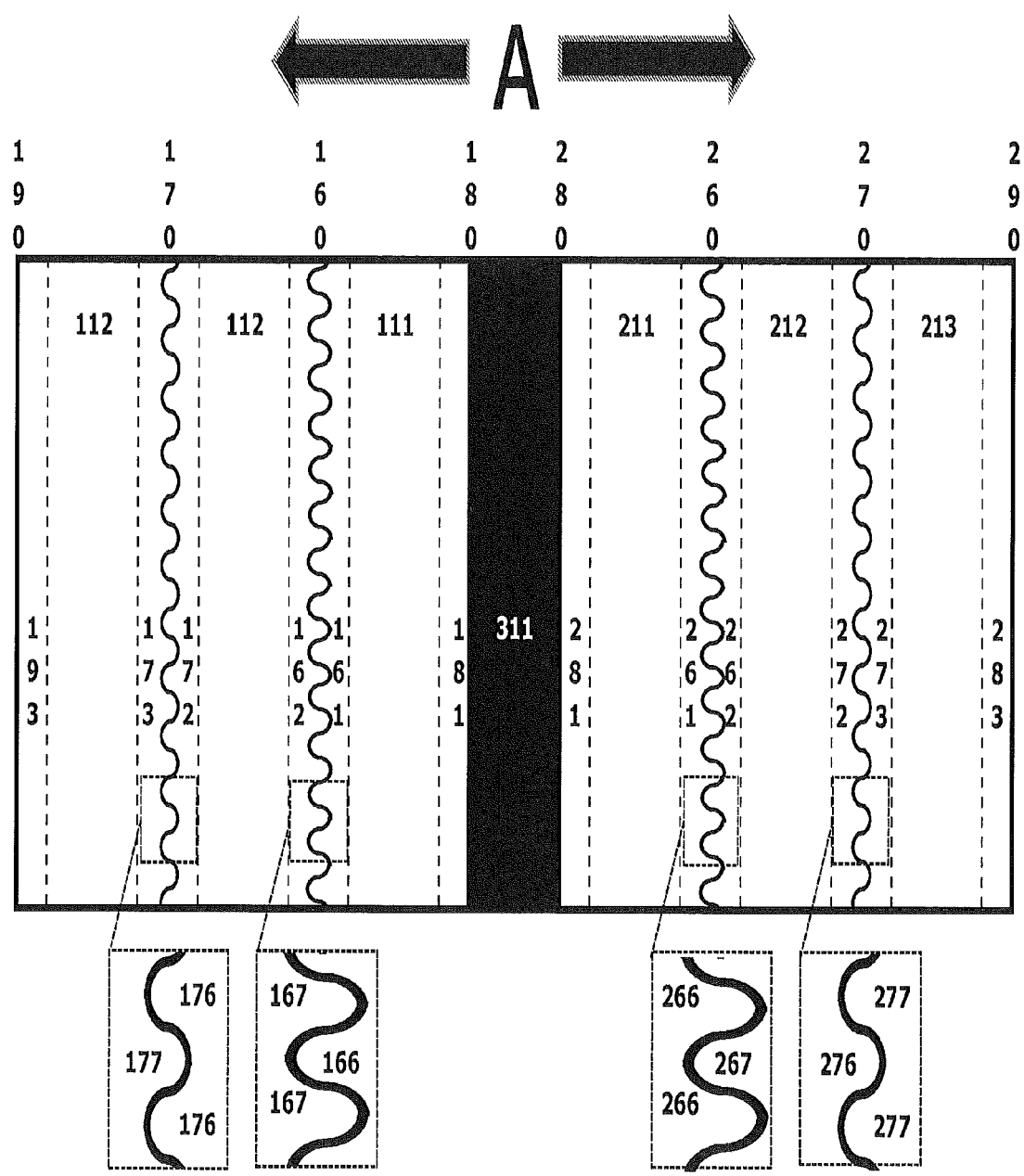
Figure 8A:
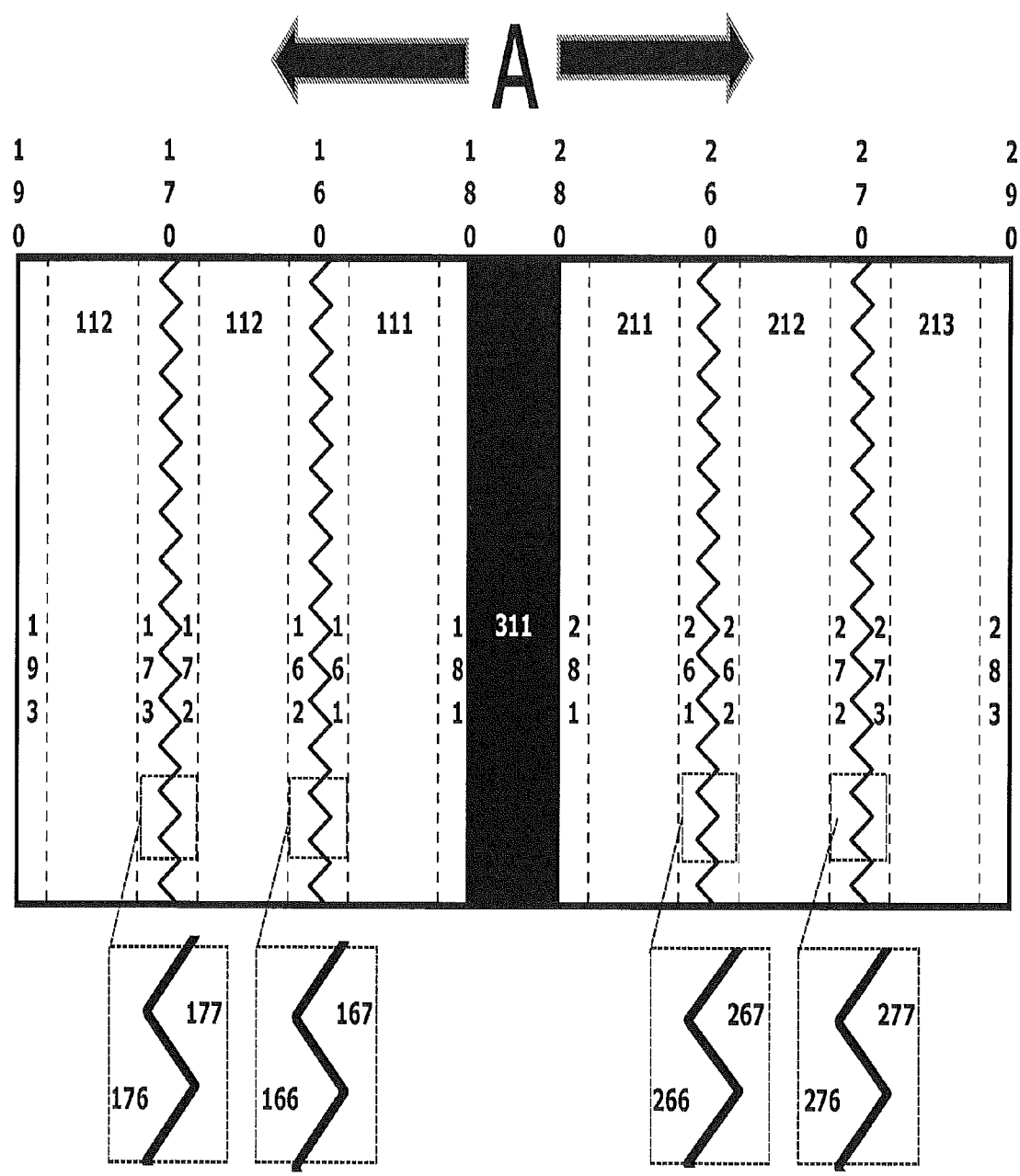
Figure 8B:
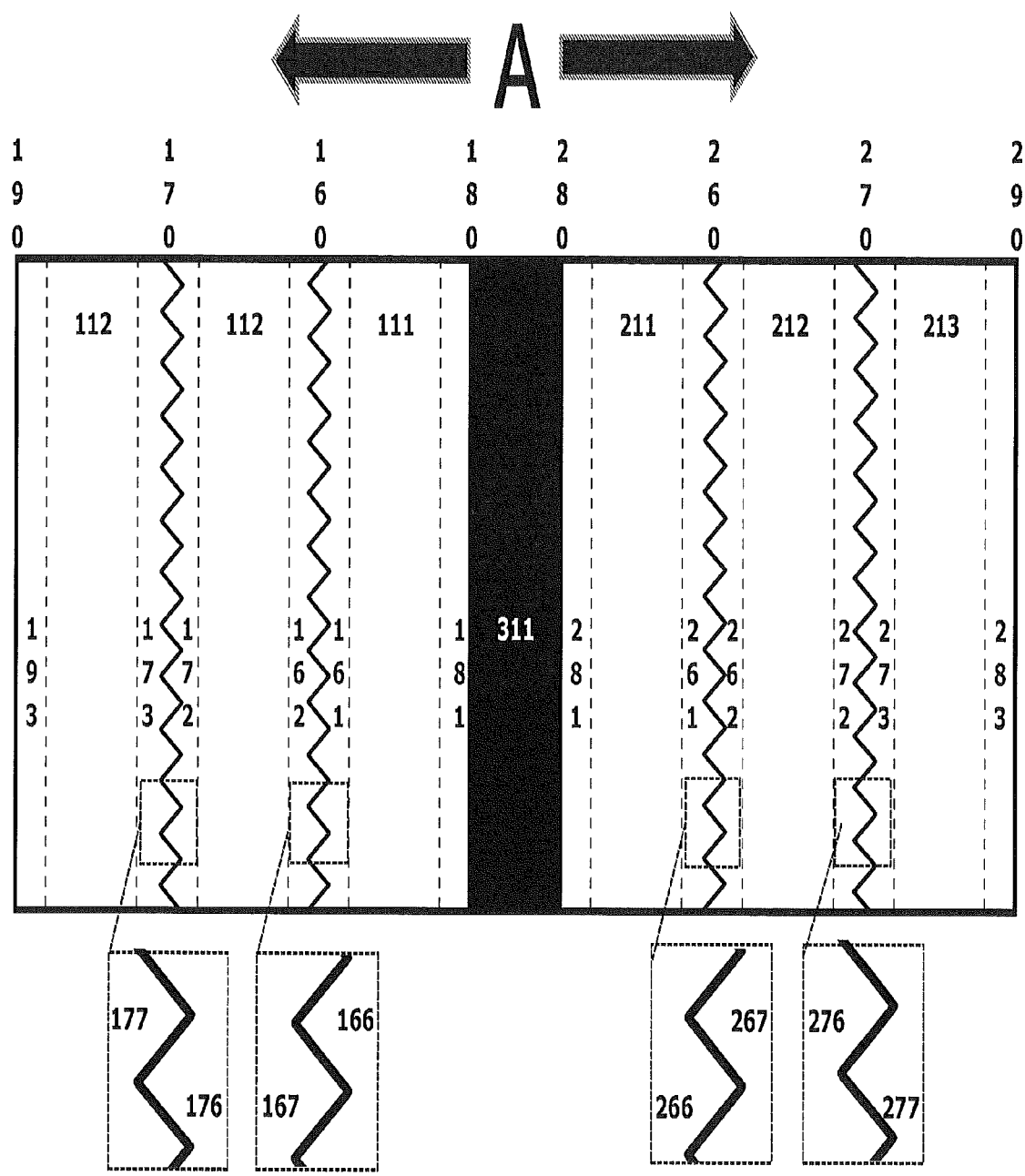
Figure 8C:
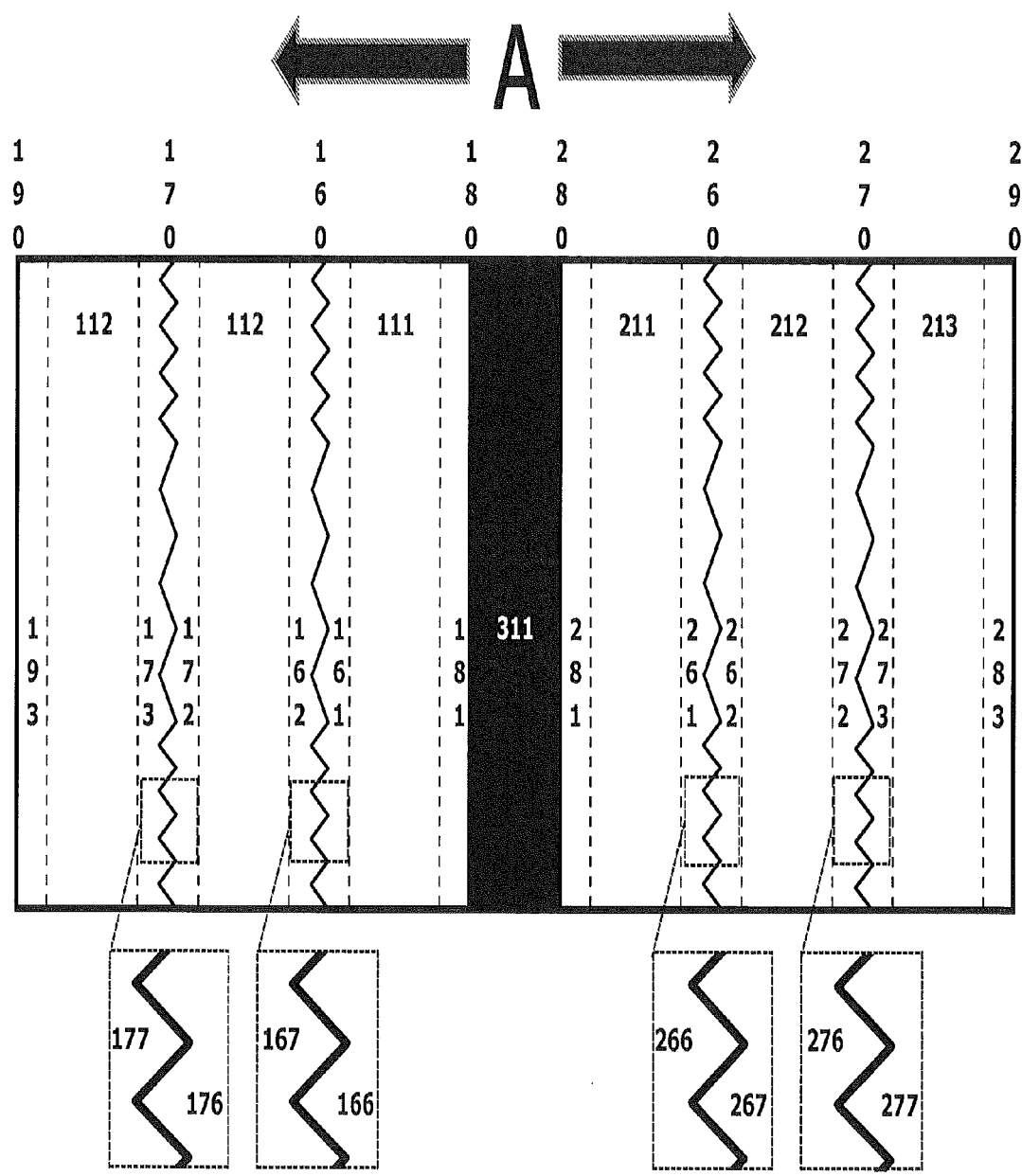
Figure 8D:
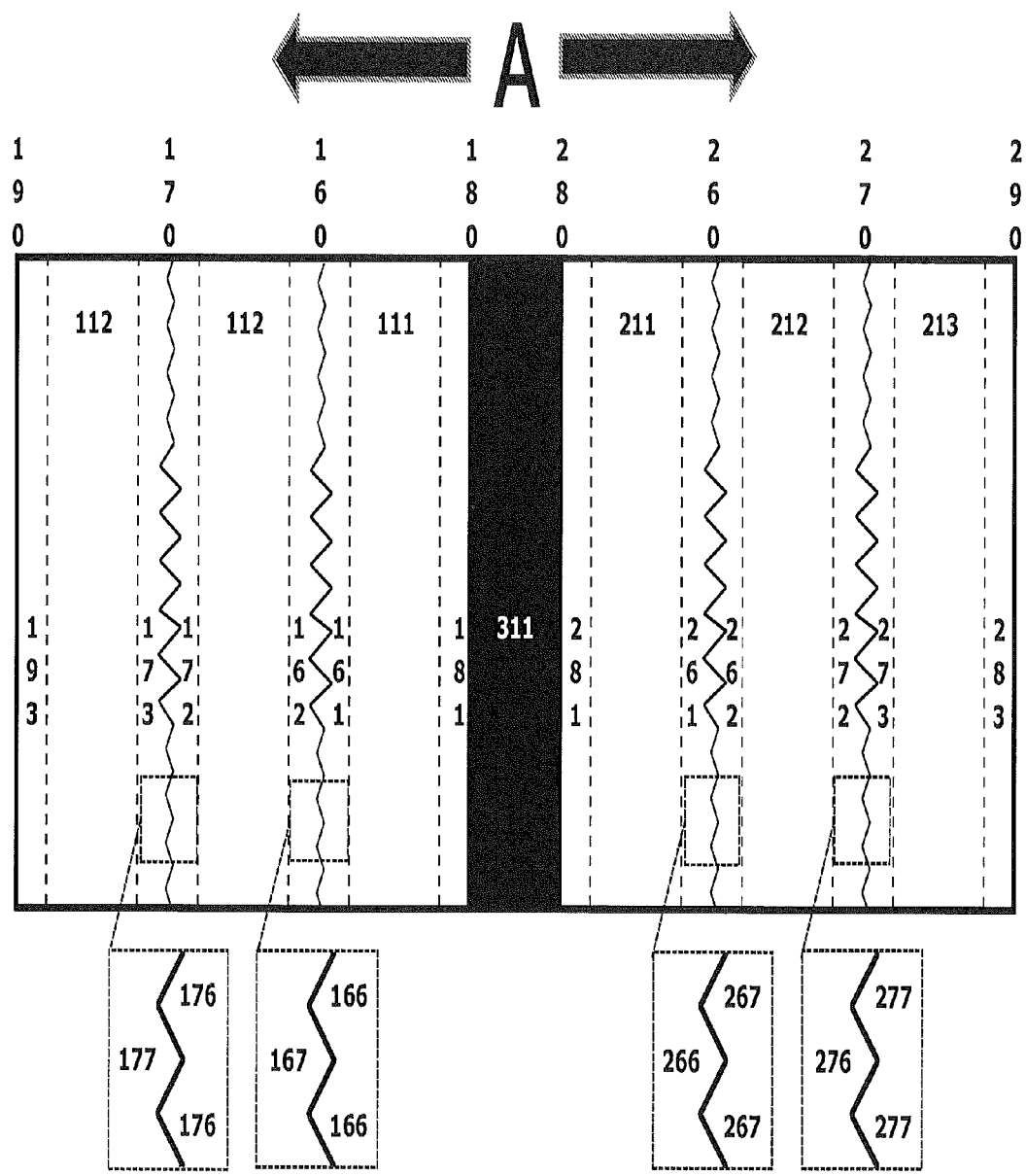
Figure 8E:
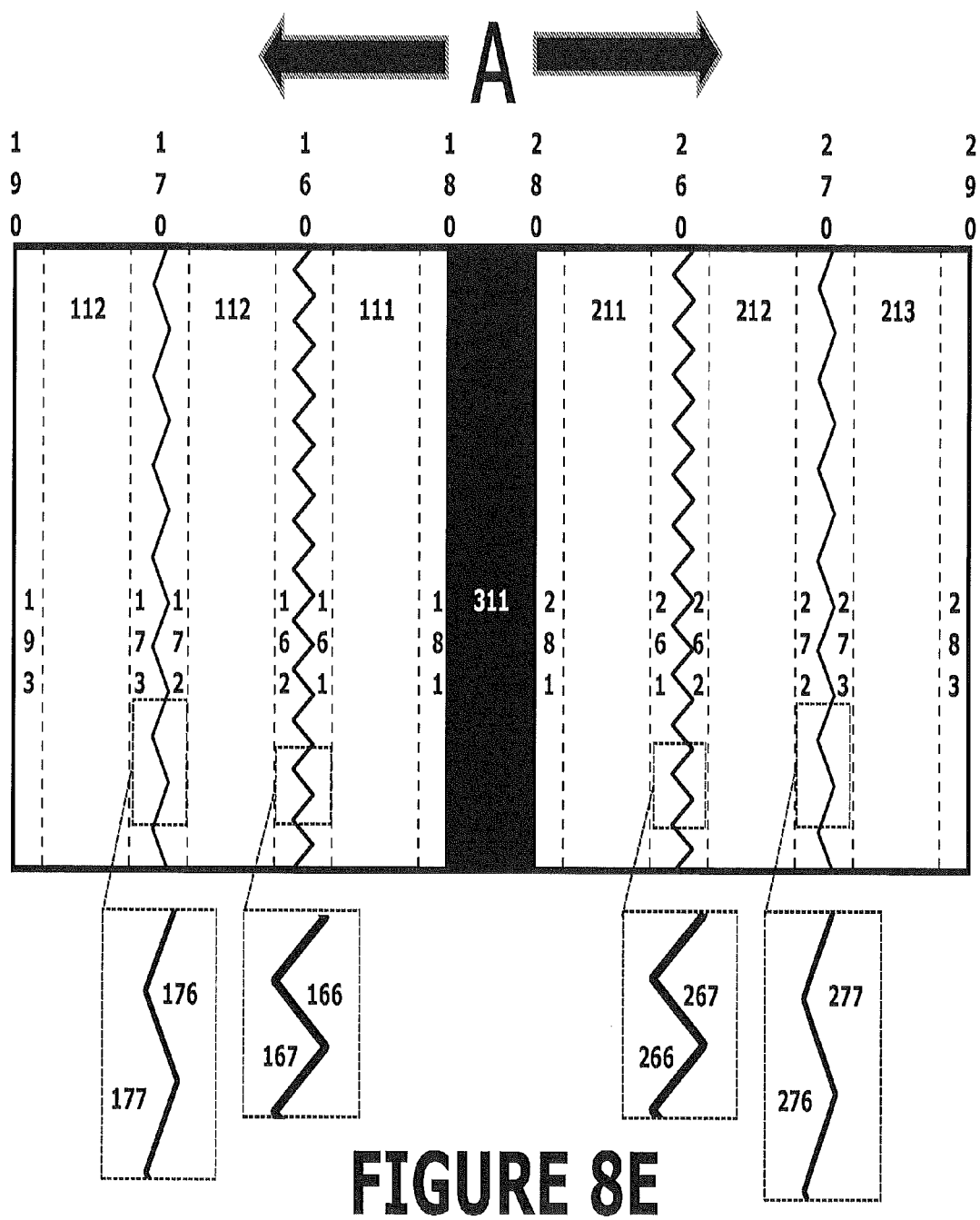
Figure 8F:
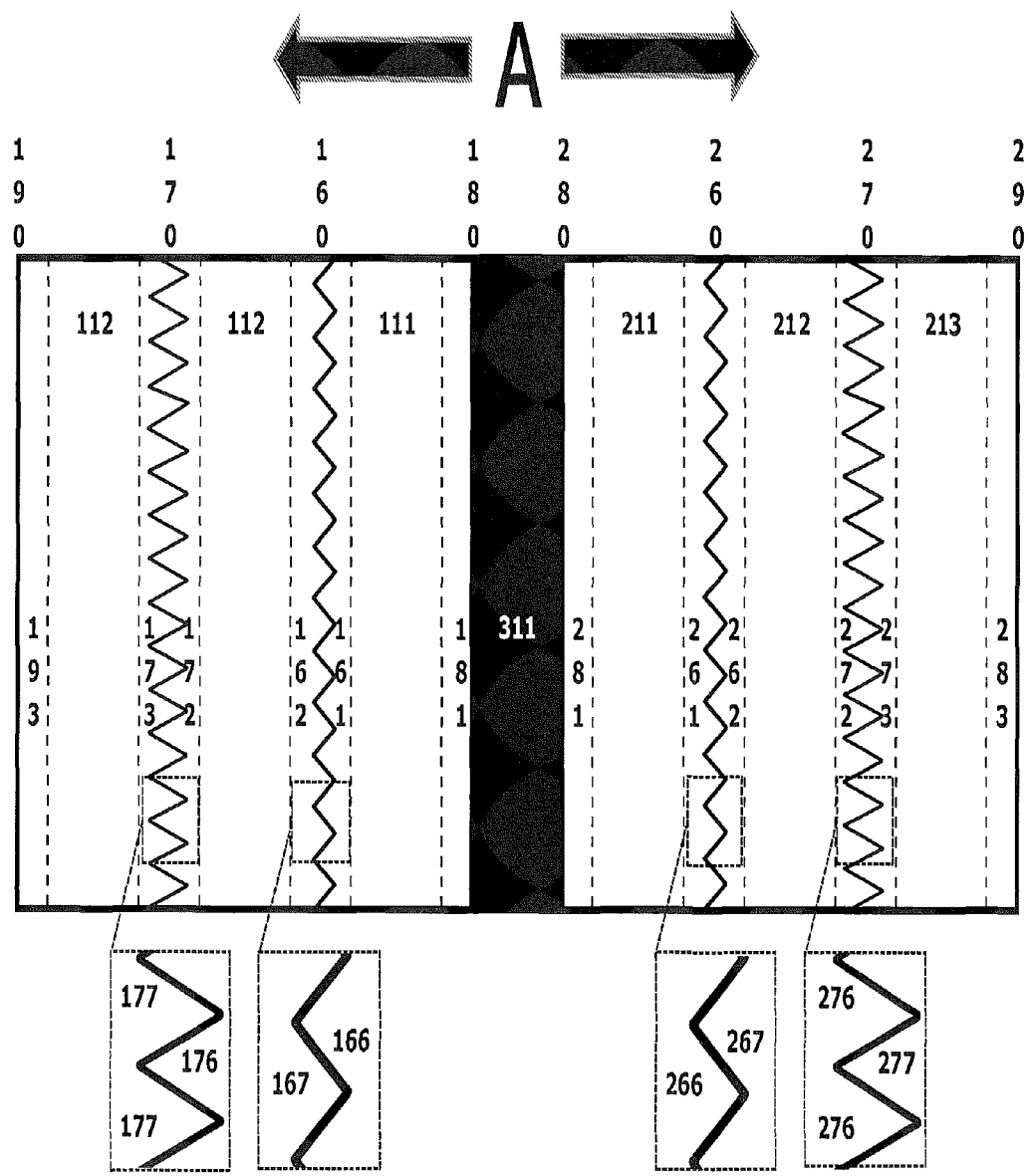
Figure 9A:
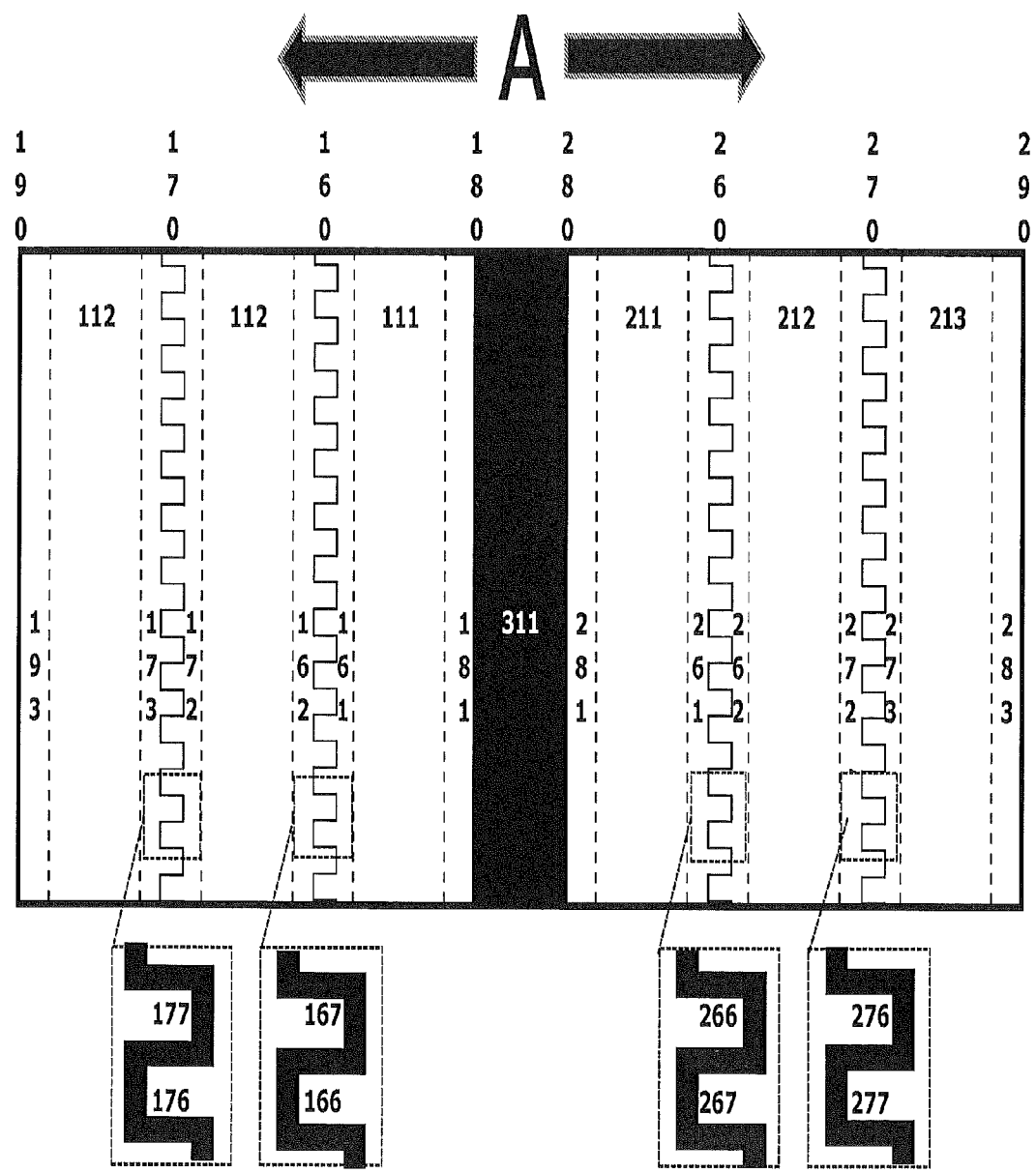
Figure 9B:
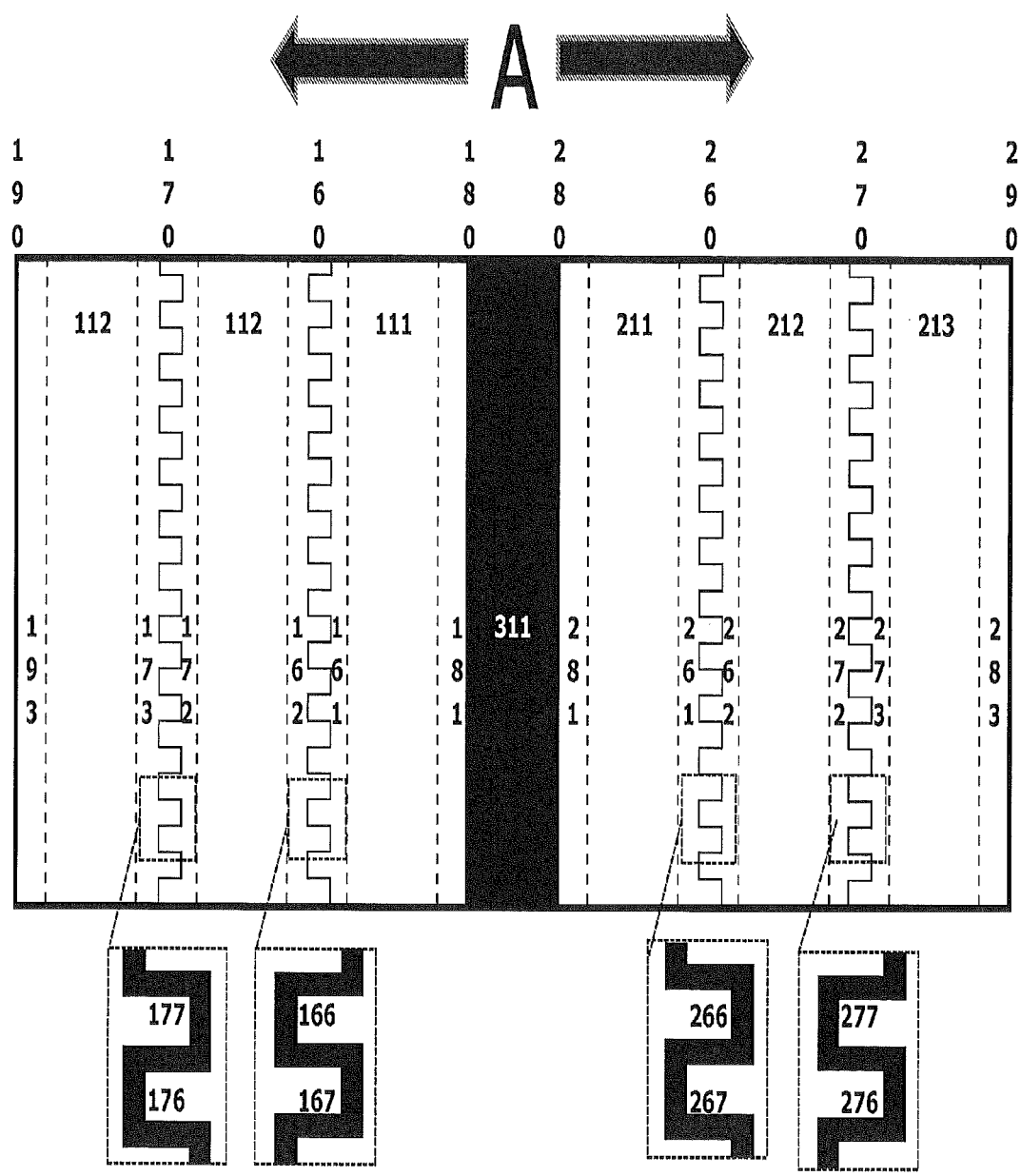
Figure 9C:
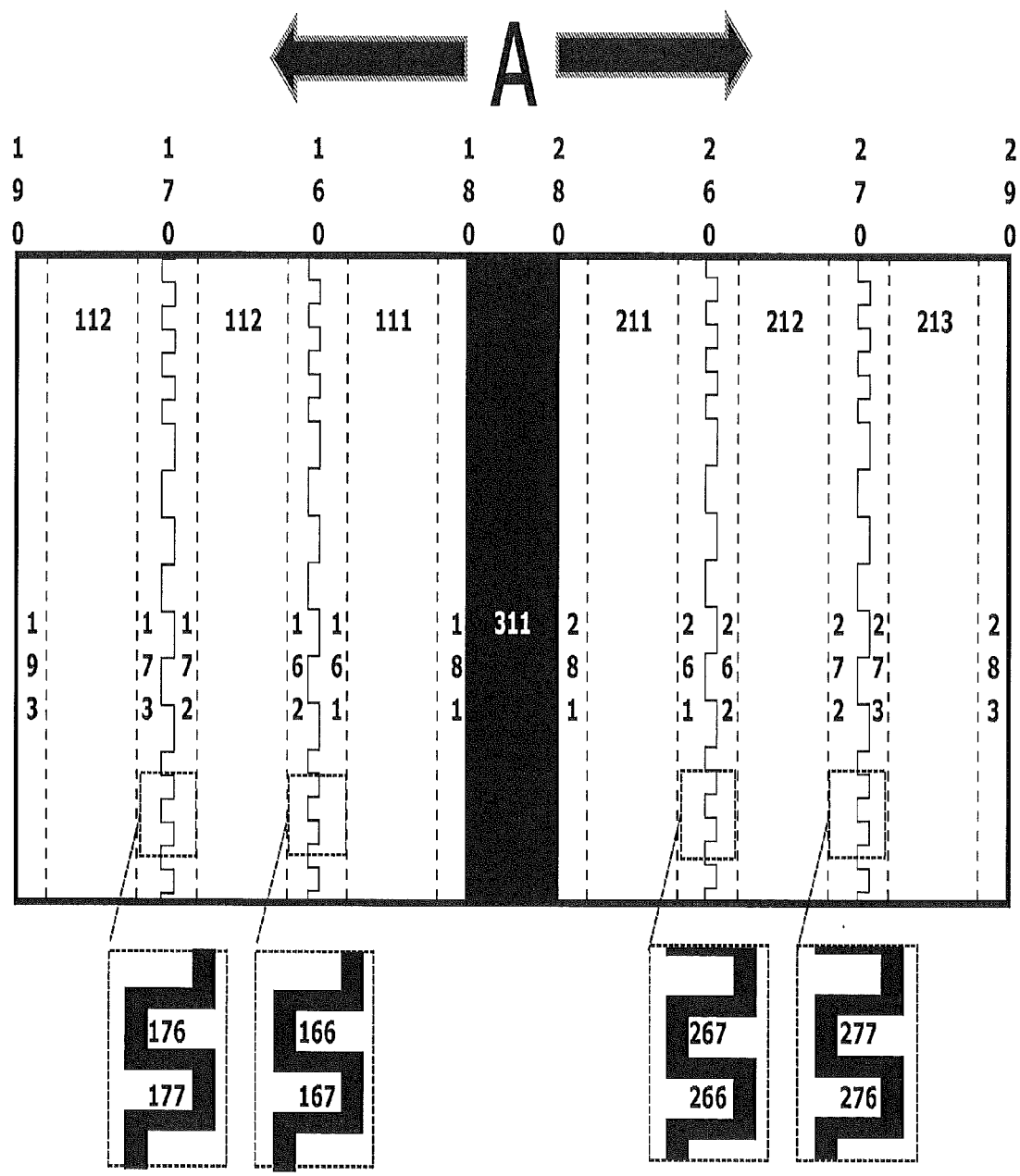
Figure 9D:
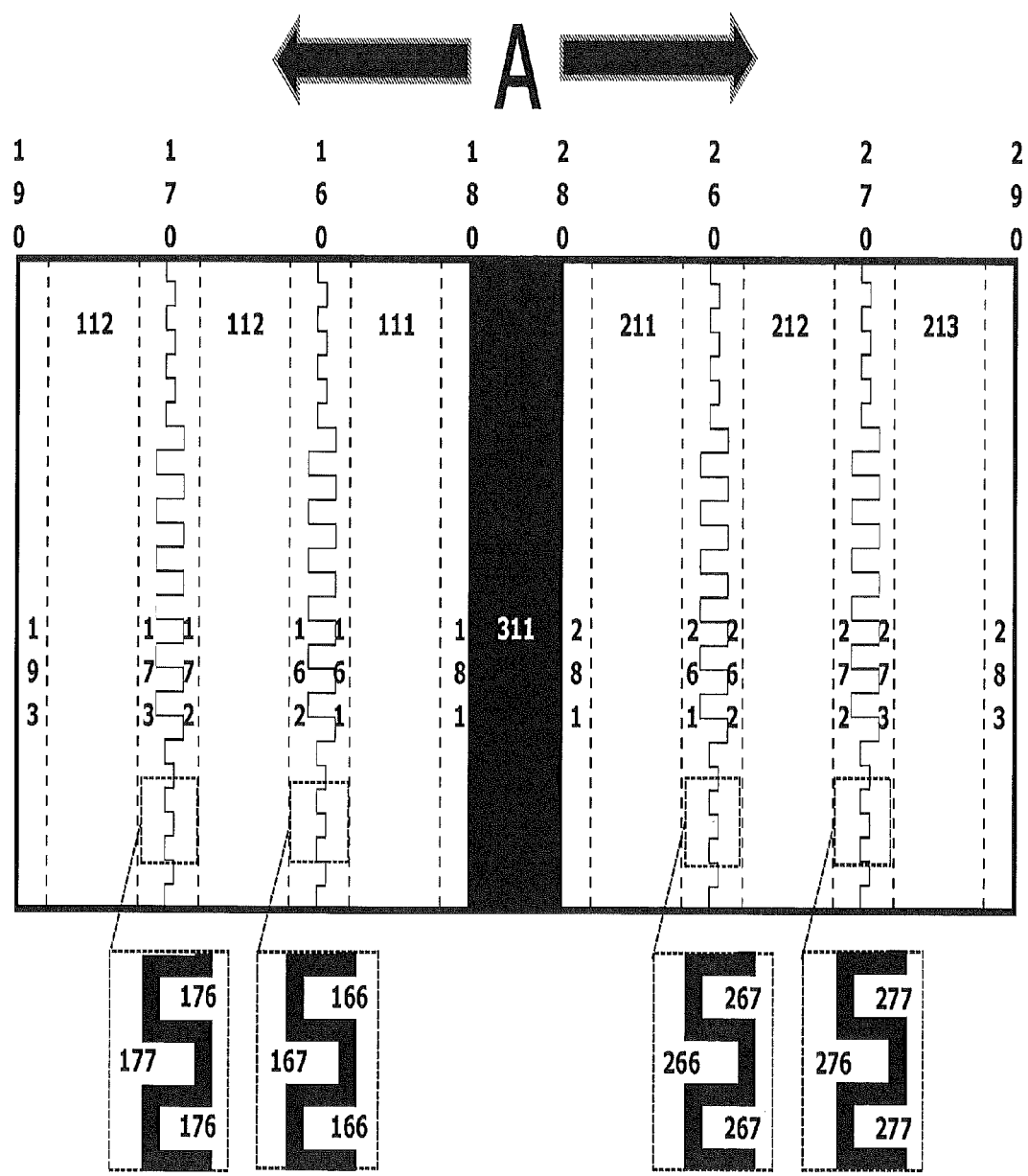
Figure 9E:
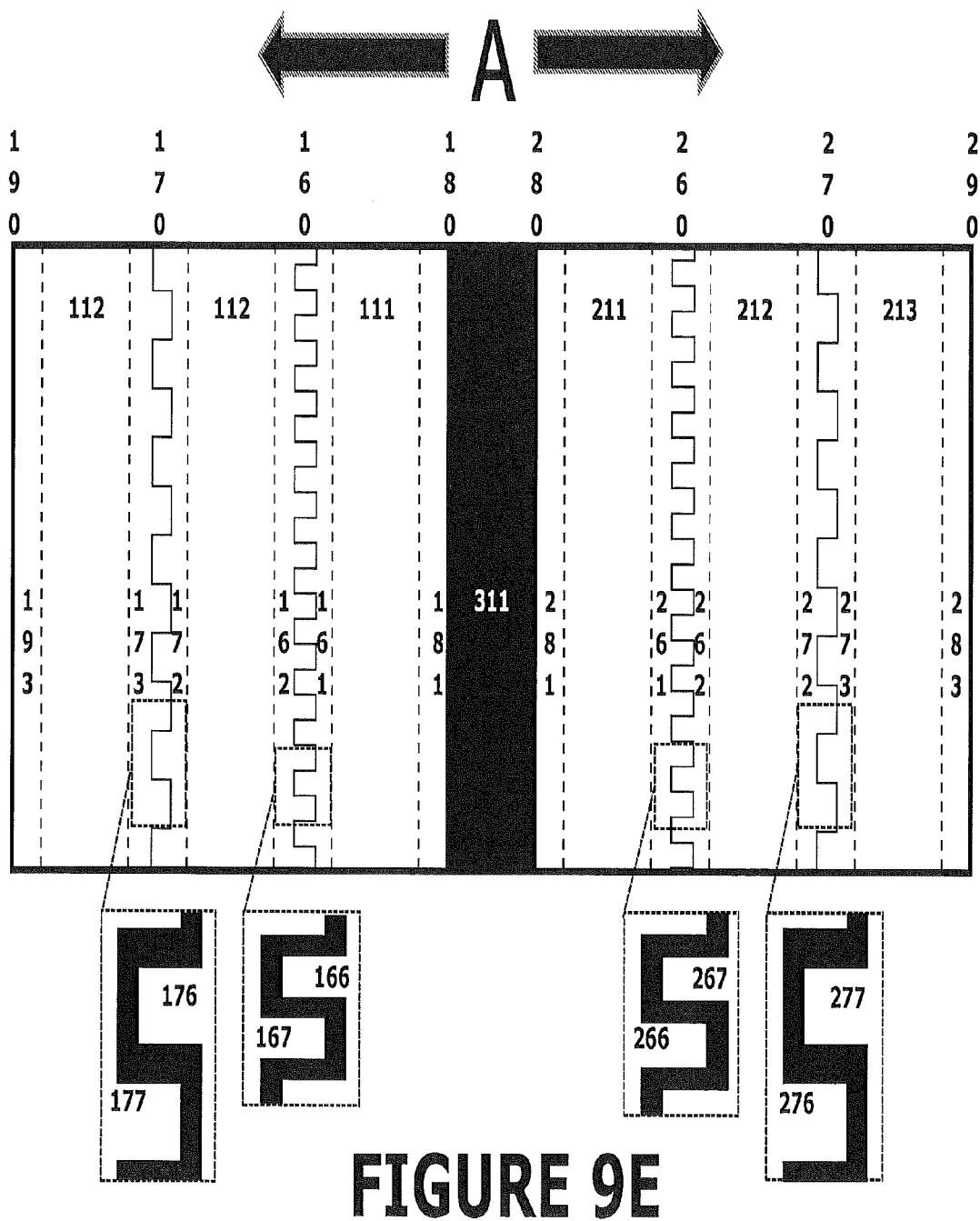
Figure 9F:
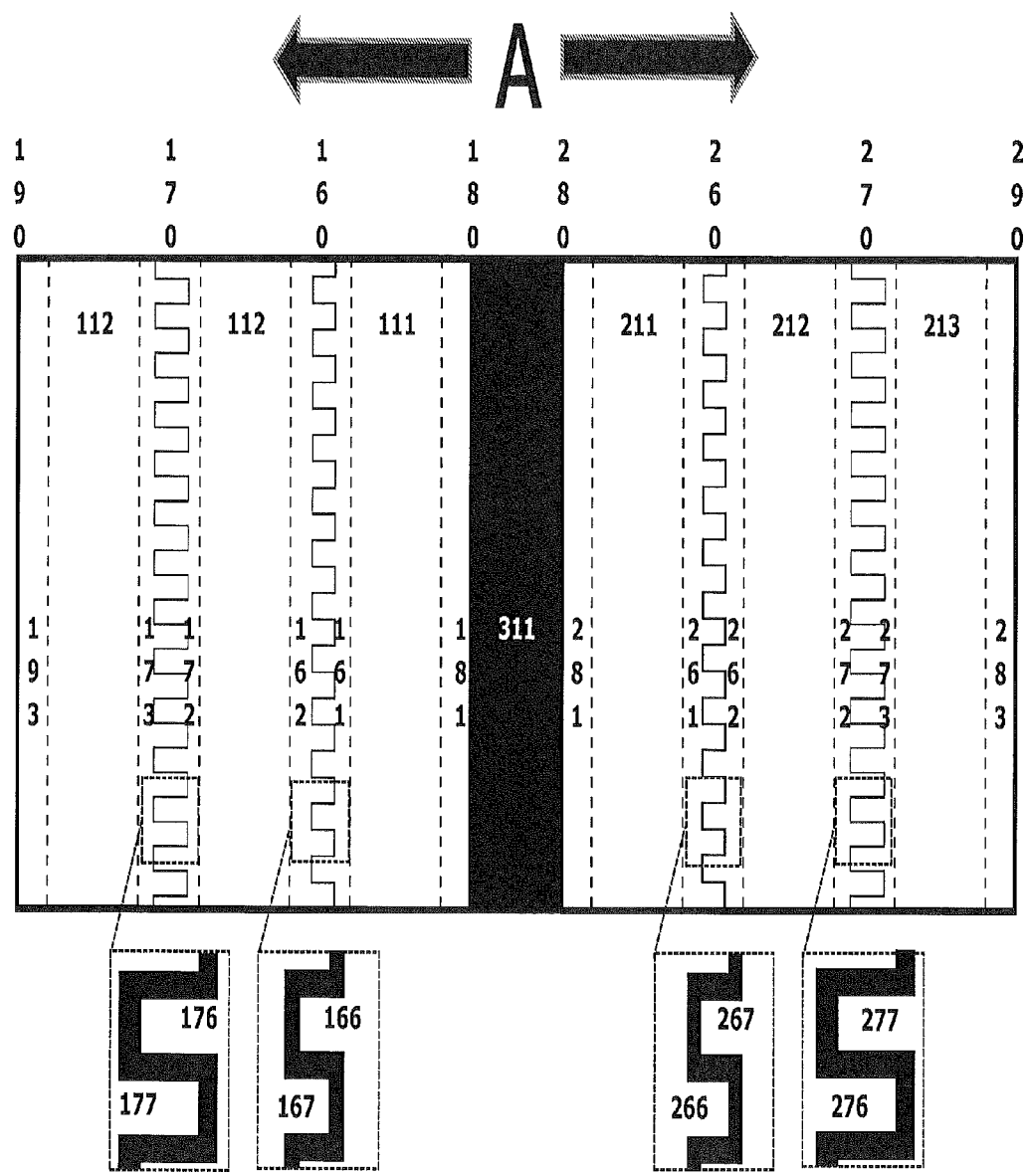
Figure 10A:
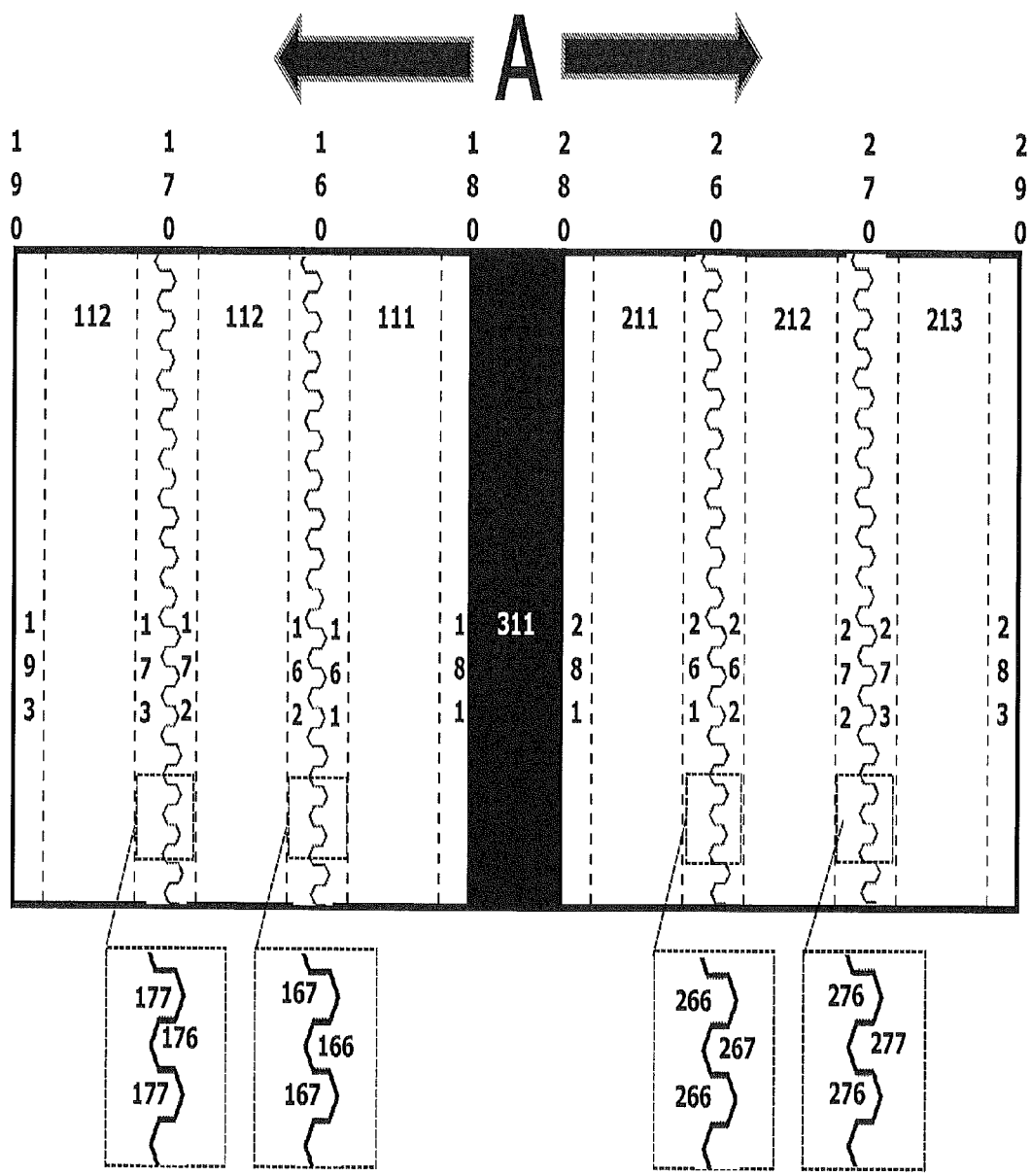
Figure 10B:
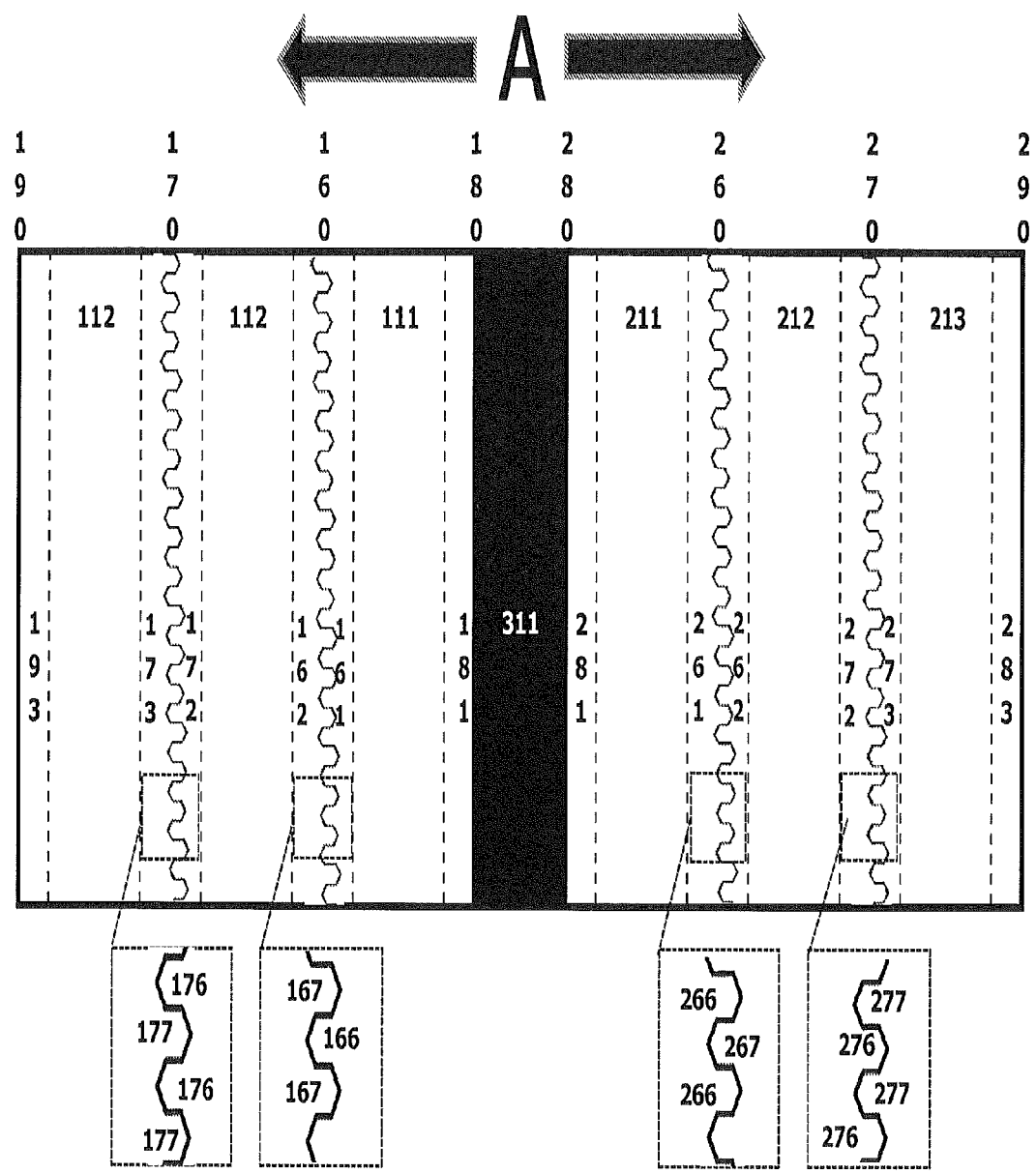
Figure 10C:
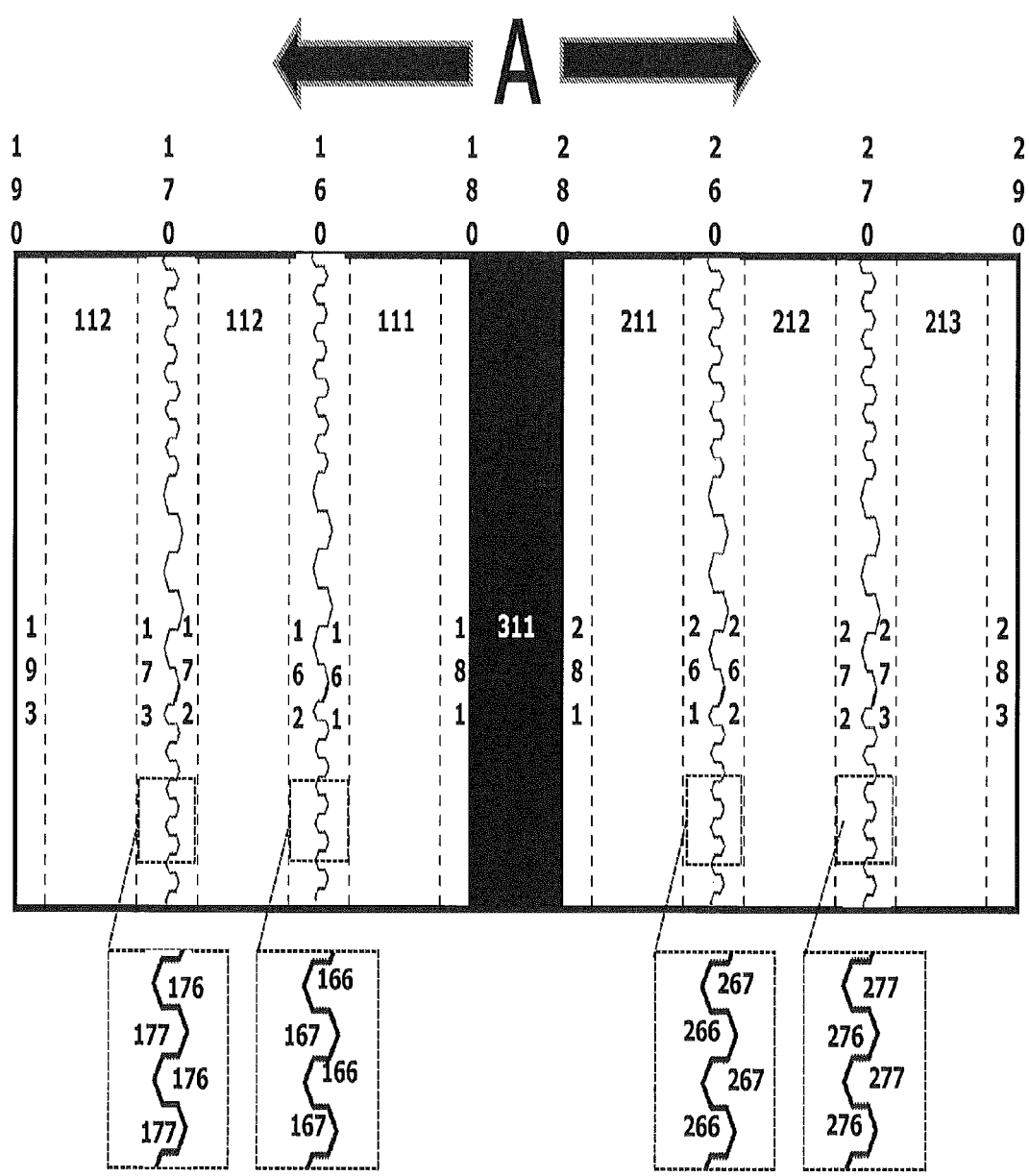
Figure 10D:
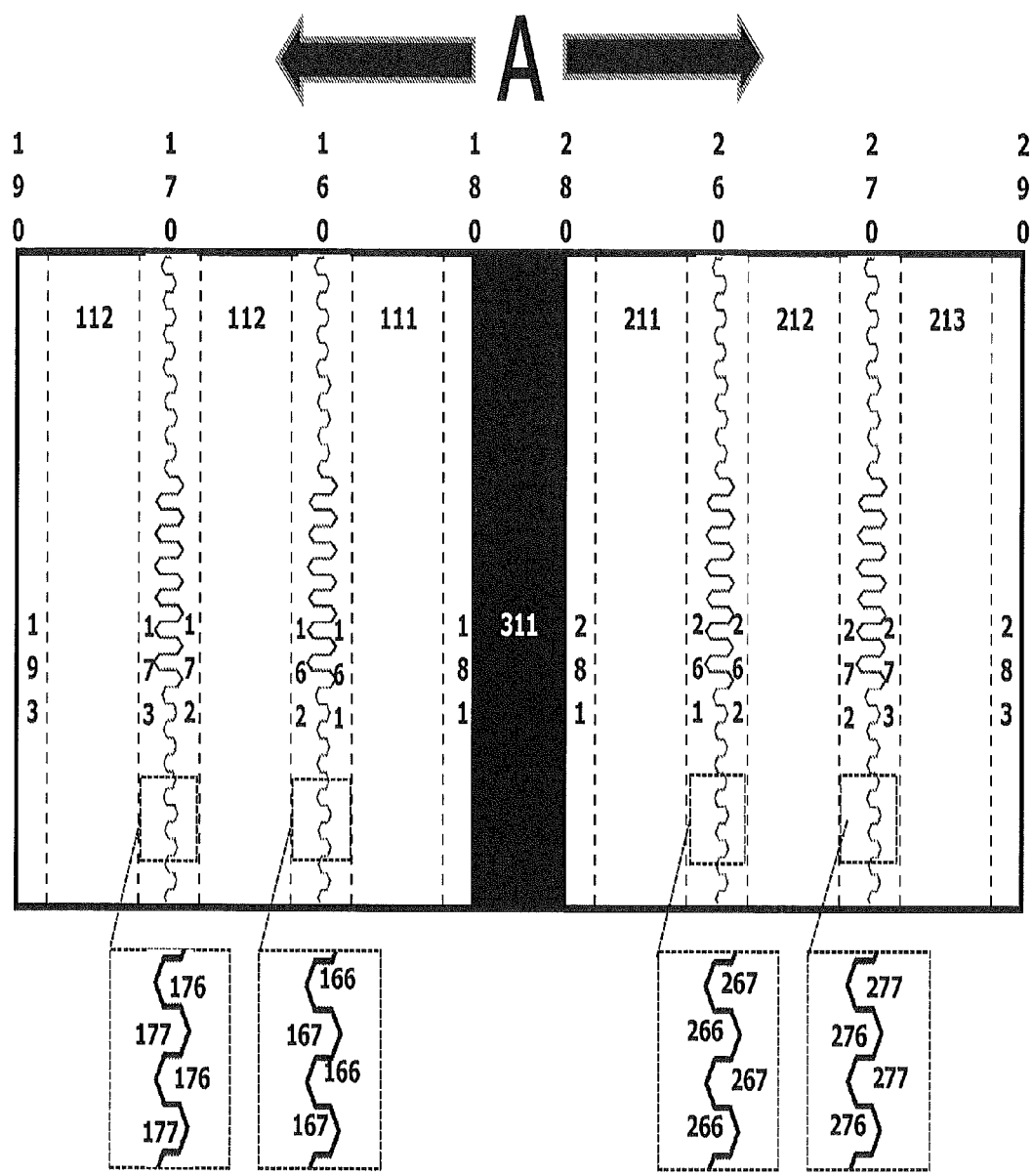
Figure 10E:
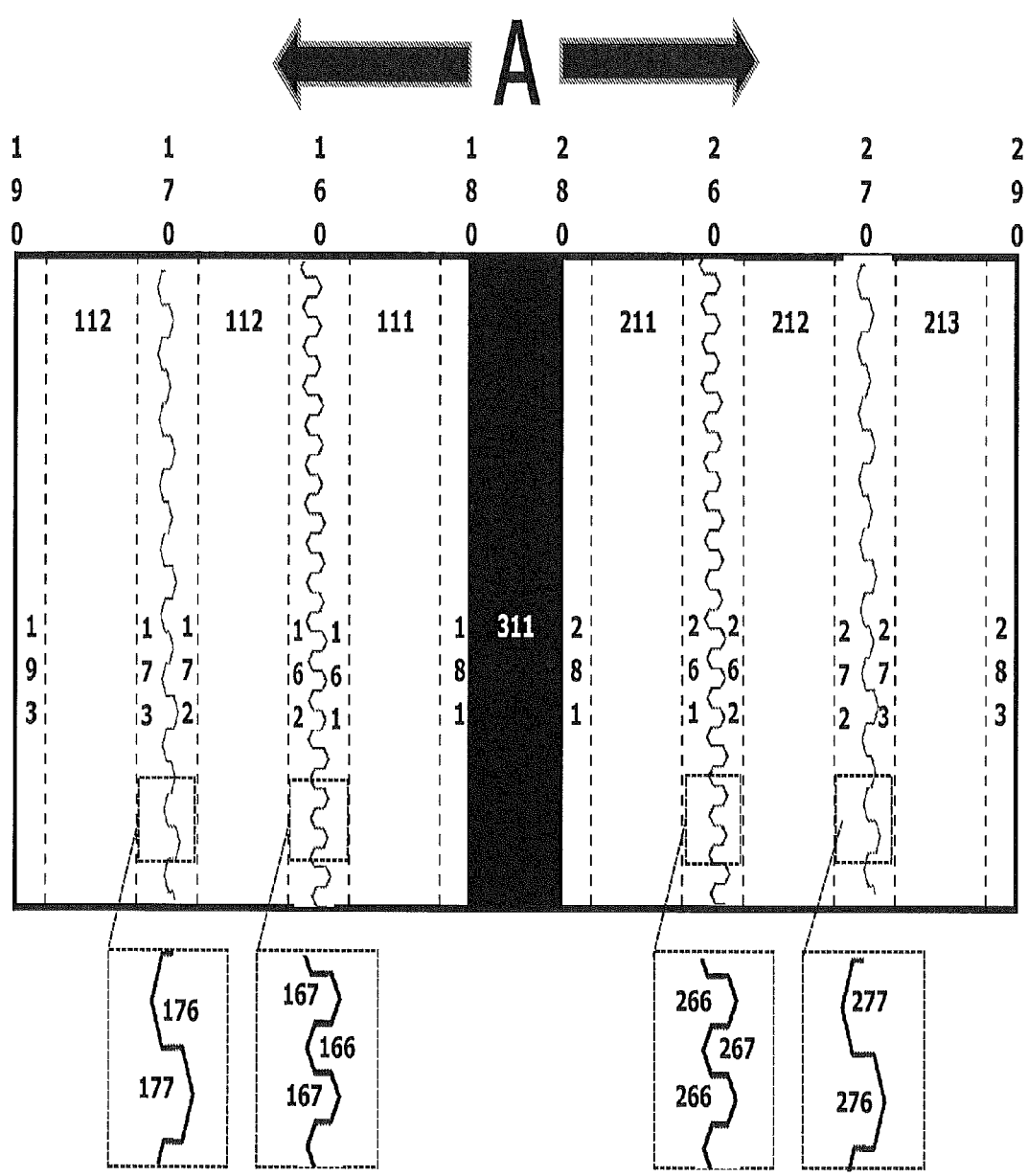
Figure 10F:
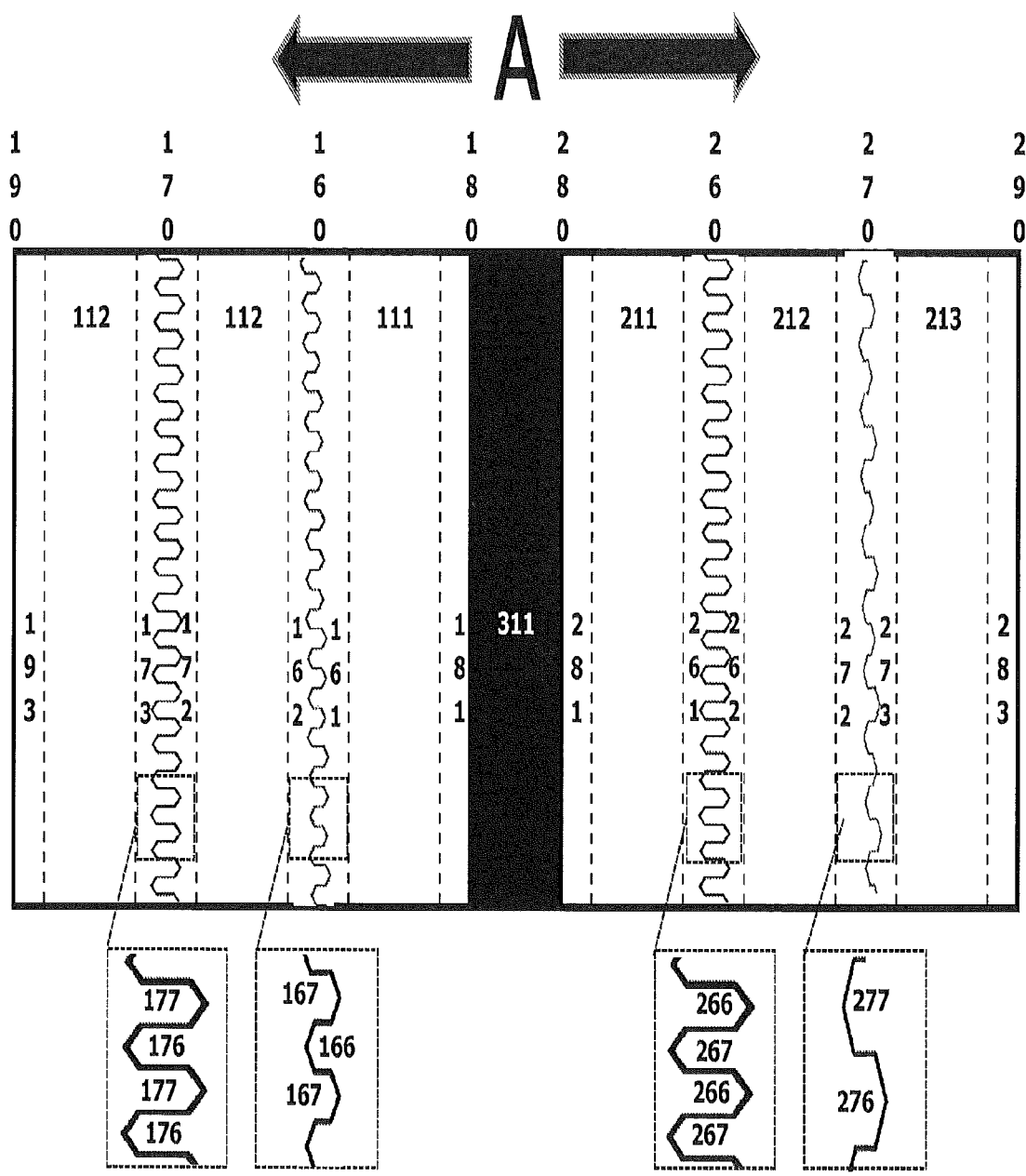

Referring to FIGS. 2-3, each wing 12, stabilizer 13-14, engine 15, and/or pylon 16 can be viewed as having an ice-susceptible surface 20 with a leading edge 30. The airstream A first encounters the leading edge 30 and then travels in a fore-aft direction therefrom.

The surface 20 is provided with an ice protection system 40 comprising an ice protection array 50 and a controller 60 operably connected to the array 50. The illustrated ice protection array 50 comprises a first set 100 of contiguous deicing zones 101-103, a second set 200 of contiguous deicing zones 201-203, and an anti-icing zone 310. The anti-icing zone 310 will usually coincide with the leading edge 30 and can be positioned between the fore zone 101 of the first deicer set 100 and the fore zone 201 of the second deicer set 200.

While the surface 20 appears flat in the drawing, this is simply for ease in illustration and explanation. In most instances, the surface 20 will have a curved profile wrapping around the leading edge 30 of the associated aircraft structure. If, for example, the ice-susceptible surface 20 is on a wing 12 or a horizontal stabilizer 13, the deicing zones 101-103 could be located on upper portion of the wing/stabilizer and the deicing zones 201-203 could be located on its lower portion. If the surface 20 resides on the vertical stabilizer 14 or one of the pylons 16, the deicing zones 101-103 could occupy its rightside portions and the deicing zones 201-203 could occupy its leftside portions. If the surface area 20 is on one of the engines 15, the deicing zones 101-103 could be situated on inner lip portions and the deicing zones 201-203 could be situated on outer lip portions.

The deicing zones 101-103 in the first deicer set 100 each comprise an envelope 111-113 defining an ice protection area 121-123. Each envelope 111-113 includes an electrothermal heater layer 131-133 which converts electric power to heat to deice the corresponding ice-protection area 121-123. The envelopes 111-113 can comprise further layers (e.g., layers 141-143, layers 151-153, etc.) surrounding the heater layers 131-133 for thermal transfer, electrical insulation, and/or protection purposes.

The deicing zones 101-103 in the first deicer set 100 each comprise an envelope 111-113 defining an ice protection area 121-123. Each envelope 111-113 includes an electrothermal heater layer 131-133 which converts electric power to heat to deice the corresponding ice-protection area 121-123. The envelopes 111-113 can comprise further layers (e.g., layers 141-143, layers 151-153, etc.) surrounding the heater layers 131-133 for thermal transfer, electrical insulation, and/or protection purposes.

The envelopes 111-112 share a common interzone border 160 and the envelopes 112-113 share a common interzone border 170, which both extend generally in a direction perpendicular to the airstream direction A. The interzone border 160 is flanked by an end region 161 of the envelope 111 and an end region 162 of the envelope 112. The interzone border 170 is flanked by an end region 172 of the envelope 112 and an end region 173 of the envelope 113.

The envelope 111 has a non-common (e.g., fore) border 180 adjacent its edge region 181 and the envelope 113 has a non-common (e.g., aft) border 190 adjacent its edge region 193. The border 180 and the border 190 also extend generally in a direction perpendicular to the airstream direction A.

The deicing zones 201-203 in the second deicer set 200 include similar envelopes 211-213 defining ice protection areas 221-223 and including envelope layers (e.g., layers 231-233, layers 241-243, layers 251-253, etc.). They also include an interzone border 260 (flanked by envelope edge regions 261 and 262), an interzone border 270 (flanked by envelope edge regions 272 and 273), a fore border 280 (adjacent envelope edge region 281), and an aft border 290 (adjacent envelope edge region 293). The interzone border 260, the interzone border 270, the fore border 280, and the aft border 290 extend generally in a direction perpendicular to the airstream direction A.

The anti-icing zone 301 can include an envelope 311 defining an ice protection area 321, housing an electrothermal heater layer 331, and including additional envelope layers 341 and 351. The anti-icing zone 310 can be bounded by borders 160 and 260 and flanked by envelope edge regions 161 and 261.

Referring to FIGS. 4-6, some possible power-supply procedures for the ice protection system 40 are shown. In each of these procedures, electrical power is episodically (not constantly) supplied to a heater for short time periods. The episode extent is selected so that enough heat is provided to loosen accumulated ice for sweeping away by the ensuing airstream. The episode-to-episode interlude is chosen so that an appropriate amount of ice accumulates therebetween. Although these time durations will vary depending upon several factors, an episode will ordinarily last about five to ten seconds and will usually be less than twenty seconds. And the interlude between episodes is generally greater than ten seconds.

In a zoned electrothermal deicing procedure, the power-supply episodes are executed in a staggering schedule so as to minimize power-draw spikes. The heaters' episodes are collectively viewed in terms of time intervals t1-tn, with different heaters being supplied power during different intervals. A cycle is completed when a power-supply episode has occurred for each deicing zone.

In FIG. 4, each cycle includes six intervals t1-t6, with power being supplied to sequentially to zones 101-103 and then sequentially to zones 201-203. In FIG. 5, each cycle includes three intervals t1-t3, with power being supplied sequentially to zones 101-103 and sequentially to zones 201-203 at the same time. In FIG. 6, each cycle includes eight intervals t1-t8, with only one deicing zone being supplied power during some of the intervals (e.g., intervals t1, t4, t5, t8) and two deicing zones being supplied with power during other intervals (e.g., intervals t2, t3, t6, t7).

The anti-icing zone 301 is continuously supplied with power in all of the illustrated power-supply procedures. This continuous supply of electrical power is intended to persistently heat the corresponding ice protection area 311 so that ice never even forms thereon. The use of such an anti-icing approach along a leading edge is considered customary in airfoil ice protection.

As was indicated above, the envelope structures commonly include further layers (e.g., layers 141-143, layers 151-153, etc.) surrounding the heater layers 131-133, at least some of which are for electrical insulation and/or protection purposes. As such, envelope constructions can often hinder the transfer of ice-melting heat to edge regions of the deicing zones. This hindering is especially apparent when two adjacent deicer envelopes share a spanwise interzone border (e.g., envelopes 111-112 sharing border 160, adjacent envelopes 112-113 sharing border 170, adjacent envelopes 211-212 sharing border 260, and adjacent envelopes 212-213 sharing border 270).

When designing a deicer envelope, the non-heating layers are generally optimized to provide adequate electrical insulation, sufficient environmental protection, maximum heat transfer, lighter weights, lower power draws, and longer lives. As such, trimming thicknesses along edge regions could compromise electrical insulation and environmental protection. Likewise, padding thicknesses along non-edge regions to equalize heat transfer parameters could cause weight and power-draw concessions.

The ice protection system 40 addresses border-heat-hindrance issues by configuring envelope edge regions to enhance deicing in these interzone vicinities.

As shown in the FIGS. 7A-10F, the interzone edge regions (i.e., edge regions 161-162, edge regions 171-172, edge regions 261-262) have non-linear contours. More specifically, the contour of interzone edge regions are provided with complementary and/or undulating edge features (i.e., features 166-167, features 176-177, features 266-267, features 276-277) which puzzle-piece together to form a continuous interzone border.

This type of perimeter profile facilitates ice removal because the edge features project-and-recess in a direction substantially parallel to the airstream direction A. With traditional deicers, ice accumulating along spanwise interzone borders follows the linear path of the envelope regions and often forms a blunt unbroken ice cordon. With the ice protection system 40, any ice accumulating along an interzone border will follow the nonlinear perimeter of the too-cold edge region. Instead of a solid cordon, the ice will be presented in pockets vacillating across the aircraft surface. To the extent that there is bonding among the ice pockets, it can be easily broken by the airstream A and swept away.

As is shown in FIGS. 7A-10F, the edge features 166-167, the edge features 176-177, the edge features 266-267, and/or the edge features 276-277 can have round, triangular, rectangular, polygonal, or any other suitable shape. The edge features of each interzone border within a set can be aligned with or they can be offset from one another (see and compare, e.g., the A figures and the B figures in the each drawing series). The features can vary in frequency or amplitude along each interzone border (see, e.g., the C-D figures each drawing series). Or they can vary in frequency or amplitude from one interzone border to another (see, e.g., E-F figures each drawing series).

Although the aircraft 10, the surface 20, the system 40, the array 50, the controller 60, the deicer set 100, the deicing zones 101-103 (and their layers, edge regions, and interzone borders), the deicer set 200, the deicing zone 201-203 (and their layers, edge regions, and interzone borders) and/or the anti-icing zone 301 have been shown and described with respect to a certain embodiments, it is obvious that equivalent alterations and modifications will occur to others skilled in the art upon the reading and understanding of this specification and the annexed drawings. Specifically, for example, ice protection systems with more or less deicing and/or anti-icing zones are feasible and foreseeable. And while a particular feature of the aircraft 10 or the ice protection system 40 may have been described above with respect to some of the illustrated embodiments, such feature may be combined with one or more other features of the other embodiments, as may be desired and advantageous.

REFERENCE NUMBERS

| | | | |
|---|---|---|---|
| 10 | aircraft | 11 | fuselage |
| 20 | ice susceptible surface | 12 | wings |
| 30 | leading edge | 13 | horizontal stabilizers |
| 40 | ice protection system | 14 | vertical stabilizer |
| 50 | ice protection array | 15 | engines |
| 60 | controller | 16 | pylons |
| 100 | first set of deicing zones | 200 | second set of deicing zones |
| 101 | fore deicing zone | 201 | fore deicing zone |
| 102 | mid deicing zone | 202 | mid deicing zone |
| 103 | aft deicing zone | 203 | aft deicing zone |
| 111 | fore deicer envelope | 211 | fore deicer envelope |
| 112 | mid deicer envelope | 212 | mid deicer envelope |
| 113 | aft deicer envelope | 213 | aft deicer envelope |
| 121 | fore ice protection area | 221 | fore ice protection area |
| 122 | mid ice protection area | 222 | mid ice protection area |

-continued

REFERENCE NUMBERS

| | | | |
|---|---|---|---|
| 123 | aft ice protection area | 223 | aft ice protection area |
| 131 | fore heating layer | 231 | fore heating layer |
| 132 | mid heating layer | 232 | mid heating layer |
| 133 | aft heating layer | 233 | aft heating layer |
| 141 | fore envelope layer | 241 | fore envelope layer |
| 142 | mid envelope layer | 242 | mid envelope layer |
| 143 | aft envelope layer | 243 | aft envelope layer |
| 151 | fore envelope layer | 251 | fore envelope layer |
| 152 | mid envelope layer | 252 | mid envelope layer |
| 153 | aft envelope layer | 253 | aft envelope layer |
| 160 | fore-mid border | 260 | fore-mid border |
| 161 | aft edge region of fore zone | 261 | aft edge region of fore zone |
| 162 | fore edge region of mid zone | 262 | fore edge region of mid zone |
| 166 | edge features | 266 | edge features |
| 167 | edge features | 267 | edge features |
| 170 | mid-aft border | 270 | mid-aft border |
| 172 | aft edge region of mid zone | 272 | aft edge region of mid zone |
| 173 | fore edge region of aft zone | 273 | fire edge region of aft zone |
| 176 | edge features | 276 | edge features |
| 177 | edge features | 277 | edge features |
| 180 | fore border | 280 | fore border |
| 181 | fore edge region of fore zone | 281 | fore edge region of fore zone |
| 190 | aft border | 290 | aft border |
| 193 | aft edge region of aft zone | 291 | aft edge region of aft zone |
| 301 | anti-icing zone | 331 | heating layer |
| 311 | envelope | 341 | envelope layer |
| 321 | ice protection area | 351 | envelope layer |

The invention claimed is:

1. An ice protection system comprising a first set of contiguous deicing zones; wherein:
   each deicing zone comprises an envelope defining an ice-protection area;
   each envelope includes an electrothermal heater layer which converts electric power to heat to deice the corresponding ice-protection area;
   at least two of the envelopes are adjacent and share a common interzone border that extend generally in a direction perpendicular to an airstream direction;
   each of the adjacent envelopes includes an edge region flanking the interzone border; and
   the edge regions of the adjacent envelopes are configured to enhance deicing at the interzone border by having nonlinear contours with edge features which project-and-recess in a direction substantially parallel to an airstream direction and to accumulate ice therein.

2. An ice protection system as set forth in claim 1, wherein the adjacent envelopes comprise a fore envelope having an edge region flanking the interzone border, this edge region having nonlinear contours with edge features which project-and-recess in a direction substantially parallel to the airstream direction; or
   wherein the adjacent envelopes comprise an aft envelope having an edge region flanking the interzone border, this edge region having nonlinear contours with edge features which project-and-recess in a direction substantially parallel to the airstream direction; or
   wherein the adjacent envelopes comprise a mid envelope having a fore edge region flanking the interzone border, this edge region having nonlinear contours with edge features which project-and-recess in a direction substantially parallel to the airstream direction; or
   wherein the adjacent envelopes comprise a mid envelope having an aft edge region flanking the interzone border, this edge region having nonlinear contours with edge features which project-and-recess in a direction substantially parallel to the airstream direction.

3. An ice protection system as set forth in claim 1, comprising an anti-icing zone positioned fore of the first set of the deicing zones.

4. An ice protection system as set forth in claim 1, comprising a second set of contiguous deicing zones; wherein:
   each deicing zone comprises an envelope defining an ice-protection area;
   each envelope includes an electrothermal heater layer which converts electric power to heat to deice the corresponding ice-protection area;
   at least two of the envelopes are adjacent and share a common interzone border;
   each of the adjacent envelopes includes an edge region flanking the interzone border; and
   the edge regions of the adjacent envelopes are configured to enhance ice deicing at the interzone border by having nonlinear contours with edge features which project-and-recess in a direction substantially parallel to the airstream direction.

5. An ice protection system as set forth in claim 4, wherein the adjacent envelopes comprise a fore envelope having an edge region flanking the interzone border, this edge region having nonlinear contours with edge features which project-and-recess in a direction substantially parallel to the airstream direction.

6. An ice protection system as set forth in claim 4, comprising an anti-icing zone positioned fore of the second set of the deicing zones, wherein the anti-icing zone is positioned between the first set of deicing zones and the second set of deicing zones.

7. An ice protection system as set forth in claim 4,
   wherein the adjacent envelopes comprise an aft envelope having an edge region flanking the interzone border, this edge region having nonlinear contours with edge features which project-and-recess in a direction substantially parallel to the airstream direction.

8. An ice protection system as set forth in claim 4,
   wherein the adjacent envelopes comprise a mid envelope having a fore edge region flanking the interzone border, this edge region having nonlinear contours with edge features which project-and-recess in a direction substantially parallel to the airstream direction.

9. An ice protection system as set forth in claim 4,
   wherein the adjacent envelopes comprise a mid envelope having an aft edge region flanking the interzone border, this edge region having nonlinear contours with edge features which project-and-recess in a direction substantially parallel to the airstream direction.

10. An ice protection system as set forth in claim 1, wherein the edge regions of the adjacent envelopes have complimentary edge features.

11. An ice protection system as set forth in claim 10, wherein the edge regions of the adjacent envelopes have undulating edge features.

12. An ice protection system as set forth in claim 11, wherein the edge features puzzle-piece together to form a continuous interzone border.

13. An ice protection system as set forth in claim 1, wherein the edge features have rounded shapes.

14. An ice protection system as set forth in claim 1, wherein the edge features are aligned.

15. An ice protection system as set forth in claim 1, wherein the edge features are offset.

16. An ice protection system as set forth in claim 1, further comprising a controller which supplies electrical power episodically to each of the deicing zones, wherein the episode extent is less than twenty seconds and wherein the episode-to-episode interlude is greater than ten seconds.

17. An ice protection system as set forth in claim 16, wherein the power-supply episodes are executed in a staggering schedule.

18. An ice protection system as set forth in claim 16, wherein power is supplied sequentially to deicing zones in the first set.

19. An ice protection system as set forth in claim 1, installed on an ice-susceptible surface, wherein the surface has a leading edge which an airstream first encounters and then travels in fore-aft direction therefrom, and wherein the deicing zones protect surface regions fore and aft of the leading edge.

* * * * *